United States Patent
Chen et al.

(10) Patent No.: US 11,196,892 B2
(45) Date of Patent: Dec. 7, 2021

(54) USE OF CLIENT COMPUTE FOR DOCUMENT PROCESSING

(71) Applicant: Microsoft Technology Licensing, LLC, Redmond, WA (US)

(72) Inventors: Jinghua Chen, Redmond, WA (US); Devesh Srivastava, Redmond, WA (US); Mashuri R Libman, Woodinville, WA (US); Anatoly Koretsky, San Antonio, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 16/696,961

(22) Filed: Nov. 26, 2019

(65) Prior Publication Data

US 2020/0382677 A1   Dec. 3, 2020

Related U.S. Application Data

(60) Provisional application No. 62/854,819, filed on May 30, 2019, provisional application No. 62/854,868, filed on May 30, 2019.

(51) Int. Cl.
H04N 1/44    (2006.01)
H04N 1/32    (2006.01)
H04N 1/00    (2006.01)

(52) U.S. Cl.
CPC ..... H04N 1/32128 (2013.01); H04N 1/00209 (2013.01); H04N 1/4486 (2013.01)

(58) Field of Classification Search
USPC ......... 358/1.1–3.29; 707/728–737, 781–788; 726/1–21, 26–35
See application file for complete search history.

(56) References Cited

U.S. PATENT DOCUMENTS 7,653,573 B2   1/2010   Hayes et al.
7,849,213 B1   12/2010  Borghetti
(Continued)

FOREIGN PATENT DOCUMENTS

WO    2012138804 A2   10/2012

OTHER PUBLICATIONS

"Policy-Based Labelling: A Flexible Framework for Trusted Data Labelling, Kyrre Wahl Kongsgard et al.", Jul. 16, 2015, IEEE, pp. 1-10. (Year: 2015).*

(Continued)

Primary Examiner — Marcellus J Augustin
(74) Attorney, Agent, or Firm — Schwegman Lundberg & Woessner, P.A.

(57) ABSTRACT

Disclosed are embodiments to manage modifications to a document such that the document conforms to requirements of a label. In some aspects, input assigning a label to a document is received. The label indicates requirements for the document. For example, the label marks the document as confidential, and requires the document to be encrypted when leaving a secure environment. The label may include additional requirements, such as particular watermarking or other content modifications to the document based on the confidential label. A device may be capable of modifying the document such that it satisfies only a subset of the label's requirements. The device then generates a message indicating a gap between the label's requirements and the state of the document, and sends the message to a network service. The network service is configured to augment the document as specified by the additional requirements indicated in the message.

20 Claims, 11 Drawing Sheets

(56) References Cited

U.S. PATENT DOCUMENTS

| | | | |
|---|---|---|---|
| 7,899,867 | B1 | 3/2011 | Sherstinsky et al. |
| 8,239,473 | B2 | 8/2012 | Pulfer et al. |
| 8,255,370 | B1 | 8/2012 | Zoppas et al. |
| 8,644,461 | B2 | 2/2014 | Ramanathan et al. |
| 8,667,269 | B2 | 3/2014 | Schibuk |
| 8,677,508 | B2 | 3/2014 | Sasaki |
| 8,972,589 | B2 | 3/2015 | Roese et al. |
| 8,990,882 | B1 | 3/2015 | Koshy et al. |
| 9,053,344 | B2 | 6/2015 | Arasaratnam et al. |
| 9,177,174 | B1 | 11/2015 | Shoemaker et al. |
| 9,197,617 | B1 | 11/2015 | Millwood et al. |
| 9,219,735 | B2 | 12/2015 | Hoard et al. |
| 9,219,752 | B2 | 12/2015 | Balinsky et al. |
| 9,473,532 | B2 | 10/2016 | Pearl et al. |
| 9,485,205 | B2 | 11/2016 | Bansal et al. |
| 9,489,657 | B2 | 11/2016 | Chudge et al. |
| 9,654,510 | B1 | 5/2017 | Pillai et al. |
| 9,680,876 | B2 | 6/2017 | Porras |
| 9,781,581 | B1 | 10/2017 | Capella et al. |
| 9,805,204 | B1 | 10/2017 | Nachenberg |
| 9,852,309 | B2 | 12/2017 | Luria |
| 10,013,566 | B2 | 7/2018 | Meyer et al. |
| 10,114,965 | B2 | 10/2018 | Lim |
| 2006/0277592 | A1* | 12/2006 | Brown .................. H04L 9/3263 726/1 |
| 2007/0123287 | A1 | 5/2007 | Mock et al. |
| 2010/0186091 | A1* | 7/2010 | Turner .................. G06F 21/604 726/26 |
| 2011/0055911 | A1* | 3/2011 | Adelman ............ H04L 63/0823 726/7 |
| 2012/0072969 | A1* | 3/2012 | Aratsu .................. G06F 21/604 726/1 |
| 2014/0026195 | A1 | 1/2014 | Marshall |
| 2014/0032670 | A1 | 1/2014 | Ellingson et al. |
| 2015/0248384 | A1* | 9/2015 | Luo ....................... G06F 40/197 715/229 |
| 2015/0286831 | A1 | 10/2015 | More et al. |
| 2015/0382197 | A1 | 12/2015 | Ren et al. |
| 2016/0283879 | A1 | 9/2016 | Behrendt et al. |
| 2017/0359306 | A1 | 12/2017 | Thomas et al. |
| 2017/0359314 | A1 | 12/2017 | Mathias et al. |
| 2018/0107834 | A1 | 4/2018 | Erofeev et al. |
| 2018/0145986 | A1 | 5/2018 | Chien |
| 2018/0196953 | A1 | 7/2018 | More et al. |
| 2018/0204213 | A1 | 7/2018 | Zappier et al. |
| 2018/0212903 | A1 | 7/2018 | Rose et al. |
| 2018/0234256 | A1 | 8/2018 | Bowen |
| 2018/0234459 | A1 | 8/2018 | Kung et al. |
| 2018/0276378 | A1 | 9/2018 | Ray et al. |
| 2018/0293400 | A1 | 10/2018 | Borup et al. |
| 2019/0081787 | A1 | 3/2019 | Bayar et al. |
| 2019/0228186 | A1 | 7/2019 | Atreya et al. |
| 2020/0380167 | A1 | 12/2020 | Chen et al. |

OTHER PUBLICATIONS

"International Search Report and Written Opinion Issued in PCT Application No. PCT/US2020/026583", dated Jun. 22, 2020, 16 Pages.

U.S. Appl. No. 16/875,555, filed May 15, 2020, Information Barriers for Sensitive Information.

"New-Address List", Retrieved From: https://docs.microsoft.com/en-us/powershell/module/exchange/new-addresslist?view=exchange-ps. Retrieved From: Dec. 14, 2020, 25 Pages.

Davis, Chris, "Connect to Exchange Online Protection PowerShell", Retrieved From: https://docs.microsoft.com/en-us/powershell/exchange/connect-to-exchange-online-protection-powershell?view=exchange-ps, Nov. 21, 2020, 7 Pages.

Davis, Chris, "Filterable properties for the Recipient Filter parameter on Exchange cmdlets". Retrieved From: https://docs.microsoft.com/en-us/powershell/exchange/recipientfilter-properties?view=exchange-ps, Oct. 7, 2020, 19 Pages.

Fox, et al., "Create a custom sensitive information type in Security & Compliance Center PowerShell", Retrieved From: https://docs.microsoft.com/en-us/microsoft-365/compliance/create-a-custom-sensitive-information-type-in-scc-powershell?view=o365-worldwide, Sep. 12, 2020, 37 Pages.

Murray, et al., "Combine Multiple Requests in one HTTP call using JSON Batching", Retrieved From https://docs.microsoft.com/en-us/graph/json-batching. Aug. 12, 2020, 6 Pages.

"International Search Report and Written Opinion Issued in PCT Application No. PCT/US2020/033267", dated Jul. 6, 2020, 14 Pages.

"Non Final Office Action Issued In U.S. Appl. No. 16/875,555", dated Aug. 9, 2021, 19 Pages.

* cited by examiner

US 11,196,892 B2

USE OF CLIENT COMPUTE FOR DOCUMENT PROCESSING

CROSS REFERENCE TO RELATED APPLICATIONS

This application claims priority to U.S. Provisional Patent Application No. 62/854,819, filed May 30, 2019 and entitled "Use of Client Compute for Document Processing." This application also claims priority to U.S. Provisional Patent Application No. 62/854,868, filed May 30, 2019 and entitled "Data Protection in Cloud Environments." The content of these prior applications are considered part of this application, and are hereby incorporated by reference in their entirety.

BACKGROUND

Modern enterprises may produce thousands of documents per week. Many of these documents may include sensitive information that is not to be disclosed except to certain approved entities. To facilitate management of this sensitive information, documents may be assigned a label that defines how the document is managed. For example, some labels may define that a document must be encrypted using a particular type of encryption when the document is transmitted over a public network. Some labels may indicate the content of the document itself must meet certain requirements. For example, some labels may require particular watermarking, headers, or footers for the document. Ensuring documents comply with their labeling requirements reduces risk that valuable organizational information is inappropriately disclosed. Therefore, improved methods of managing document labeling requirements are needed.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
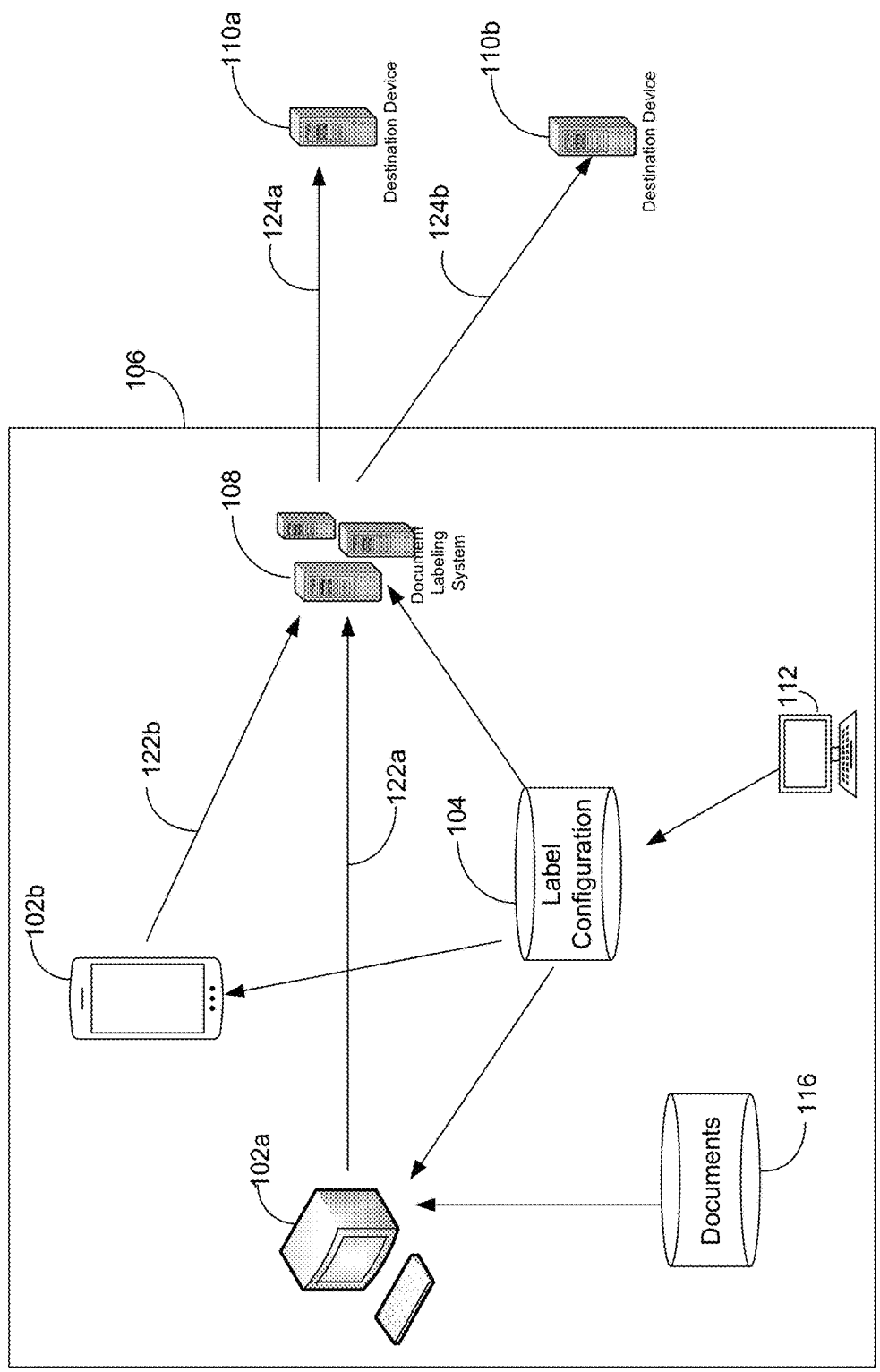
FIG. 1 is an overview diagram of a document labeling system that may be implemented in one or more of the disclosed embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

While it is important to ensure documents comply with their labeling requirements as discussed above, this does impose certain burdens on systems charged with ensuring this compliance. For example, requirements may require encryption of some documents, which can improve a relatively high computational burden on a system required to perform it. Ensuring the necessary computer power is available to handle such a computational burden can impose additional costs on a provider of such a system. These additional costs can be particularly acute if a centralized system is responsible for handling a large volume of documents from a large number of diverse devices.

Making any modifications necessary to ensure document compliance also can introduce latency into document processing. Thus, for example, if a particular computing system receives a document and is tasked with forwarding the document into a network, any tasks necessary to first make the document compliant with its label will increase the latency between when the document is received and its forwarding.

The disclosed embodiments provide for assigning labels to electronic documents. An assigned label may indicate one or more requirements for the document. For example, a document labeled as "confidential" may require that document to include a watermark, header, or footer indicating the document is confidential. A document labeled as "top secret" may require the document to be encrypted when transferred over an electronic medium. Each of the requirements defines a value or criterion for a document property. A label may define required values or criterion for one or more document properties. When a document is initially assigned a label, in some embodiments, the document does not conform to requirements of the label.

The disclosed embodiment further provide for modifying the electronic documents such that the documents do conform to requirements imposed by their respective assigned labels. Moreover, the disclosed embodiments provide for distribution of processing load despite variations in capability of some of the devices participating in the disclosed embodiments.

As described in more detail below, devices may vary in their ability to modify documents. Some devices may be configured to include particular applications able to manipulate or operate on various document types. For example, a first document type may be proprietary, and require an application published by a particular vendor to be installed on a computer before that computer may edit or otherwise modify documents of the first document type. Some computers may have this proprietary application installed while others may not. Similarly, some encryption algorithms may have processing and/or memory requirements that exceed capabilities of some devices, while other devices may have adequate computing resources to perform the encryption.

Despite the variability in device capabilities, distributing computing tasks to these devices has beneficial effects to a distributed system that includes both devices designed for use by a single user, and other devices that may be tasked with processing associated with multiple and sometimes a large number of users. For example, a central server, such as an email server, may incur large processing overhead if tasked with conforming documents attached to email messages to respective labels assigned to those documents. Delegating some of the responsibility of this document conformance to client devices initiating the emails is beneficial to the central server, in that its processing requirements are reduced. This is the case even if there is some variability across what different client devices of the central server may accomplish.

Thus, the disclosed embodiments provide for distribution of a variable amount of processing overhead associated with conforming documents to their respective labels. The disclosed embodiments describe example message formats that facilitate communication by a first device to communicate, to a network service, zero or more modifications to a document that are needed in order to conform the document to a label assigned to the document. The document is also identified by, or sometimes included in, the message itself. The message may further identify modifications, consistent with the label, that are already made to the document. Upon receiving the message, the network service is able to determine modifications specific to the identified document that need to be performed to conform the document to its assigned label. Since some network services (e.g. running on back-end or server devices) have access to more compute resources and/or software capabilities than the first device (e.g. client, mobile, or devices designed for an individual user), the network service may have generally more capabilities than the first device.

The disclosed example message formats enable the network service to dynamically adapt its processing of documents to complement document processing already performed by the first device. When a first device is more capable, the network service's burden to conform a document to its assigned label may be relatively less. When a third device is relatively less capable than the first device, the network service may perform a proportionally larger share of the processing overhead necessary to conform the document to its assigned label. In other words, the described message formats allow the network service to "fill in the gaps" in processing capabilities of the first device and third device, as necessary, and across multiple client devices having varying capabilities. The resulting solution provides for an overall decrease in compute resources needed for a successful implementation of the network service. This reduces cost of providing the network service, and may improve performance and the customer experience as well.

FIG. 1 is an overview diagram of a document labeling system that may be implemented in one or more of the disclosed embodiments. The document labeling system 100 includes two devices 102*a* and 102*b*. Each of the two devices 102*a-b* read label configuration information from a label configuration data store 104. The label configuration data store maps document labels to one or more requirements for documents. Each of the client devices 102*a* and 102*b* obtain documents from a documents data store 116. In some aspects, the two client devices 102*a* and 102*b* may obtain documents from separate data stores. In some aspects, the documents data store 116 is represented by a local file system for each of the respective devices 102*a* and 102*b*. A document from the document data store 116 may be assigned a label. For example, a user interface displayed on the device 102*a* and/or the device 102*b* may provide for selection of a label for a particular document. Assigning a label to a document indicates that the document must conform to requirements associated with the label. These requirements are also indicated by the label configuration data store 104. The label requirements are particularly enforced when documents leave a secure environment, such as the secure environment 106. The secure environment 106 may represent an access boundary, such as a network access boundary. As one example, access to a network within the secure environment 106, or to data flowing on the network, may require access credentials that are managed by a particular enterprise, such as a corporation or other organization. Without such credentials, no access to the network or network data is possible within the secure environment 106. Outside the secure environment 106, a different set of access credentials, or potentially no access credentials, are necessary to access data on the network.

FIG. 1 also shows a document labeling system 108. The document labeling system 108 may be an email server in some embodiments. The devices 102*a* and 102*b* send documents to the document labeling system 108. For example, if the document labeling system 108 is an email server, the devices 102*a* and 102*b* send email messages to the system 108 for processing and forwarding to destination devices 110*a* and 110*b* respectively.

As discussed above, ensuring documents transmitted outside the secure environment 106 conform with requirements of their respective labels imposes certain processing requirements on the document labeling system 108. For example, some labels may require particular types of encryption be applied to a document. Encrypting document contents consumes processing, memory, and other computing resources. If the system 100 relied on the document labeling system 108 for a majority or all of tasks necessary to ensure document conformance with assigned labels, substantial resource consumption may occur on the document labeling system 108. To manage this load, a provider of the document labeling system 108 may incur additional expense by providing for faster, more powerful, or additional server hardware to adequately handle the load imposed. To minimize the cost incurred by the provider of the document labeling system 108, it is desirable to distribute tasks associated with conforming documents to their labels to the devices 102*a* and/or 102*b*.

However, capabilities of the devices 102*a* and/or 102*b* may vary. For example, the devices 102*a* and 102*b* may be manufactured by different organizations that include different features on the respective devices. Furthermore, the devices may vary in the amount of memory installed, hard disk space available, processor speed or capability, or other types of variation. Thus, the devices 102*a* and 102*b* may vary in their ability to process documents in a manner consistent with the applied label. As one example, while a particular label may require a document of a particular type to include a particular document footer, an editor for particular document type may not be available for or installed on an operating system running on the device 102*a*. The editor may be available on the device 102*b*. Similarly, the device 102*b* may not be equipped with enough memory or disk space to run an encryption algorithm specified for a particular document label, whereas the device 102*a* may have sufficient memory.

Thus, the label requirements specified in the label configuration data store 104 may exceed the capabilities of the devices 102*a* and 102*b* in one or more respects, which may vary between the devices 102*a* and 102*b*. While the document labeling system 108 has sufficient resources to meet the label requirements, having the document labeling system 108 perform all of the document processing necessary to conform to the document labels consumes an undesirable amount of compute resources of the document labeling system 108, as discussed above.

Thus, the disclosed embodiments provide for the devices 102*a-b* to perform a portion of document processing necessary to conform a document to its label, and then provide for the document labeling system 108 to complete any remaining processing necessary upon receiving the document from the device 102*a* or 102*b*.

To facilitate this capability, the disclosed embodiments provide message definitions for communication between the devices 102*a* and 102*b* with the document labeling system 108. As shown in FIG. 1, device 102*a* sends a message 122*a* to the document labeling system 108. The message indicates a document for processing by the document labeling system 108. The message 122*a* further indicates which processing to conform the document to its label that was performed by the device 102*a*, and/or any remaining processing necessary for the document labeling system 108 to complete before further transmitting the document to, for example, the external system 110*a* via message 124*a*.

Device 102*b* sends a second message 122*b* to the document labeling system 108. The second message 122*b* indicates a second document for processing by the document labeling system 108. The second message 122*b* further indicates different processing performed by the device 102*b* than was indicated in the message 102*a*. The second message may alternatively or additionally indicate processing necessary by the document labeling system 108 to conform the second electronic document with its label.

Therefore, the document labeling system 108 receives documents having a variable amount of processing provided by each of the devices 102*a* and 102*b*. The document labeling system 108 then performs different processing for documents received from the device 102*b* and device 102*a*. Thus, the document labeling system 108 provides for adaptive document processing. By dynamically adapting the processing of documents by the document labeling system 108, the disclosed embodiments are able to make use of some computing resources on the devices 102*a* and 102*b* in order to conform documents to their respective labels, while also dynamically adapting to variations in each devices 102*a* and 102*b* abilities.

The document labeling system 108 may be implemented using a variety of configurations, depending on the embodiment. In some embodiments, the document labeling system 108 is a single device accessible via a network. In some other embodiments, the document labeling system 108 is comprised of multiple physical devices, that may be accessible via a single host name or network address, for example, via a load balancer. In some embodiments, the document labeling system 108 is implemented as a cloud based service. Thus, the document labeling system 108 in these embodiments is accessible via a network address or hostname, but is be implemented by a dynamic pool of cloud based devices, which may be dynamically allocated or deallocated to the pool in order to implement the service for a variety of reasons. For example, in some embodiments, a first physical device is allocated to the pool of devices implementing the service and then a cloud management system adds one or more additional physical devices to implement the service in concert with the first physical device. Other devices may be removed from the pool of devices implementing the service.

FIG. 1 also shows an administrative console 112. The administrative control provides for configuration of a mapping between document labels and requirements of documents with said labels. The label configuration 112 is read by each of the devices 102*a*, 102*b*, and the document labeling system 108.

Figure 2:
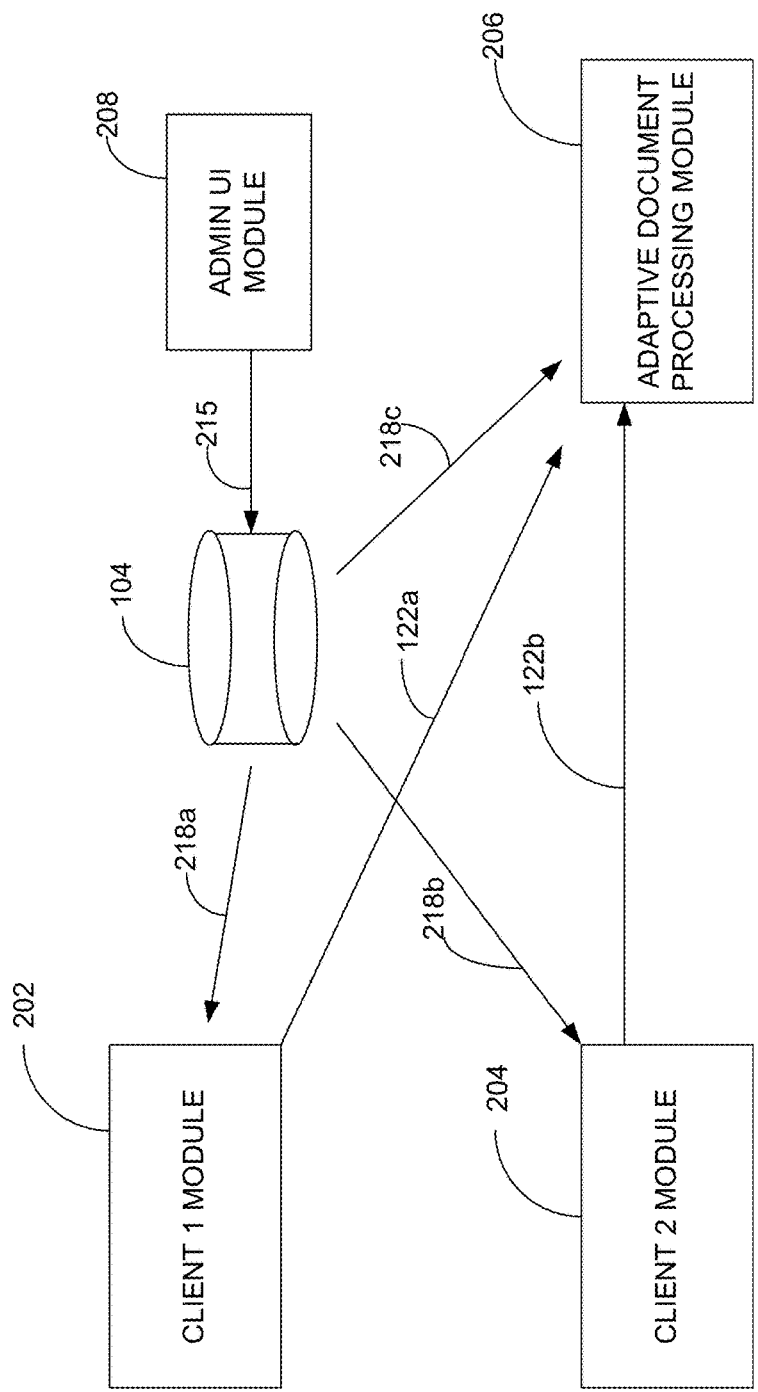
FIG. 2 is a block diagram of components that may be implemented in one or more of the disclosed embodiments.

FIG. 2 is a block diagram of components that may be implemented in one or more of the disclosed embodiments. FIG. 2 shows a client 1 module 202, client 2 module 204, an adaptive document processing module 206, and an administrative user interface module 208. Each of the modules 202, 204, 206, and 208 may include software instructions that configure hardware processing circuitry to perform one or more of the functions attributed to each of the respective modules. The data flows shown in FIG. 2 are analogous to those shown in FIG. 1. The client 1 module 202 may be executed on the device 102*a*. The client 2 module 204 may execute on the device 102*b*. The adaptive document processing module may execute on the document labeling system 108. The administrative user interface module 208 may execute on the administrative console 112.

As shown each of the client 1 module 202 and client 2 module 204 send messages 122*a* and 122*b* respectively to the adaptive document processing module 206. The administrative user interface module 208 writes mappings defining requirements for document labels via data flow 215. Each of the client 1 module 202, client 2 module 204, and adaptive document processing module 206 read the mappings from the label configuration database 104 via data flows 218*a-c* respectively.

As discussed above with respect to FIG. 1, the client devices 102*a* and 102*b* may vary in their abilities to conform documents to particular labels. Similarly, each of the client 1 module 202 and client 2 module 204 may further vary in this regard. For example, the client 1 module 202 may include instructions that perform a particular type of encryption, while the client 2 module 204 does not include similar instructions. The adaptive document processing module 206 is configured to adapt to these differences, enabling the client 1 module 202 to perform said encryption, which off loads the adaptive document processing module 206 from performing this function. The adaptive document processing module 206 may still perform the encryption as necessary when receiving documents from the client 2 module 204.

Figure 3:
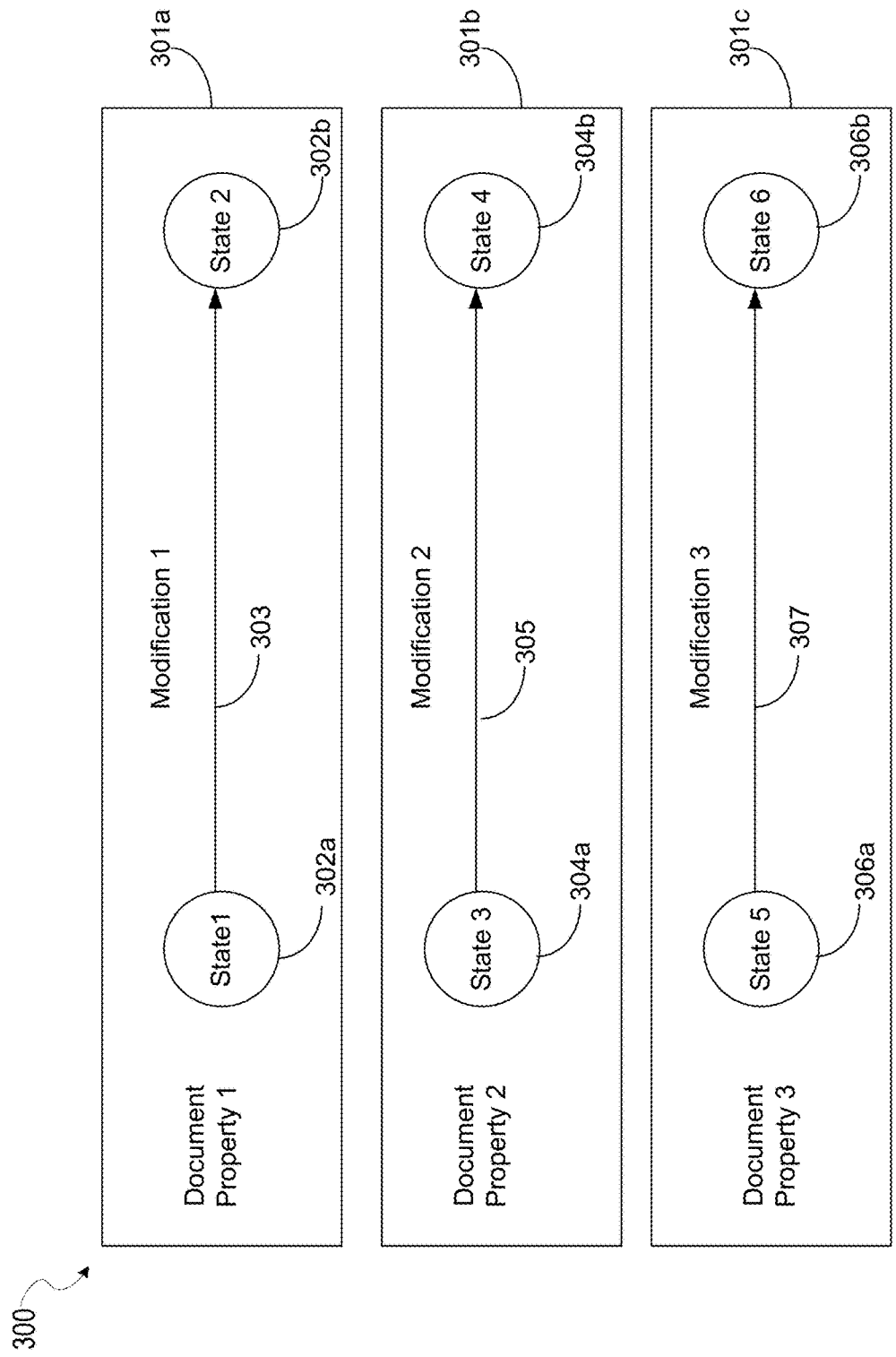
FIG. 3 is a diagram illustrating document properties, property states, and modifications that change document properties from one state to a different state.

FIG. 3 is a diagram illustrating document properties, property states, and modifications that change document properties from one state to a different state.

FIG. 3 shows three document properties 301*a-c*. Each document property represents a characteristic or feature of a document. For example, a document property can include a header of the document, a footer of the document, a background of the document, an encryption level of the document, a password protected status of the document (e.g. whether the document is password protected and/or a password protecting the document). As discussed above, embodiments of this disclosure seek to conform a document with requirements defined by a label assigned to the document. A requirement, as discussed herein, defines a particular document property and a state of that property necessary for the requirement to be met. For example, if a requirement pertains to a document footer, the requirement indicates, in some embodiments, that the footer must include the words "confidential." The footer including the words "confidential" is a state of the footer.

FIG. 3 illustrates three example document properties 301a-c. Each of the properties includes at least two states. As shown, document property 301a can be in one of at least two states, shown as 302a and 302b. a modification 303 functions to move the document property 301a from the first state 302a to the second state 302b.

Similarly, document property 301b is in one of at least two states 304a-b. A modification 305 functions to move the document property 301b from to third state 304a to a fourth state 304b. Document property 301c is in one of at least two states 306a-b. A modification 307 functions to move the document property 301c from a fifth state 306a to a sixth state 306b.

Example document properties include one or more of a footer of the document, a header of the document, a watermark of the document, an encryption level of the document, an encryption algorithm of the document, whether the document is password protected, a password complexity of a password of the document, metadata requirements of the document (e.g. one or more metadata fields has been erased or has not been erased), revision history verbosity of the document, a cover page of the document, information relating to macros included in the document, or other document properties.

Each of the states 302a-b, 302c-d, and 302e-f can also be considered to represent individual criterion met by the corresponding document property when in the particular state. For example, a "footer" document property may be required by a particular label to include the word "confidential," but the label may allow the footer to include additional text as well. Thus, enforcing a document property to maintain a particular state does not necessarily require the document property to have only one acceptable value, but may instead require that the document property to meet a criterion with the criterion being met when the document property has any one of a plurality of differing values.

Figure 4:
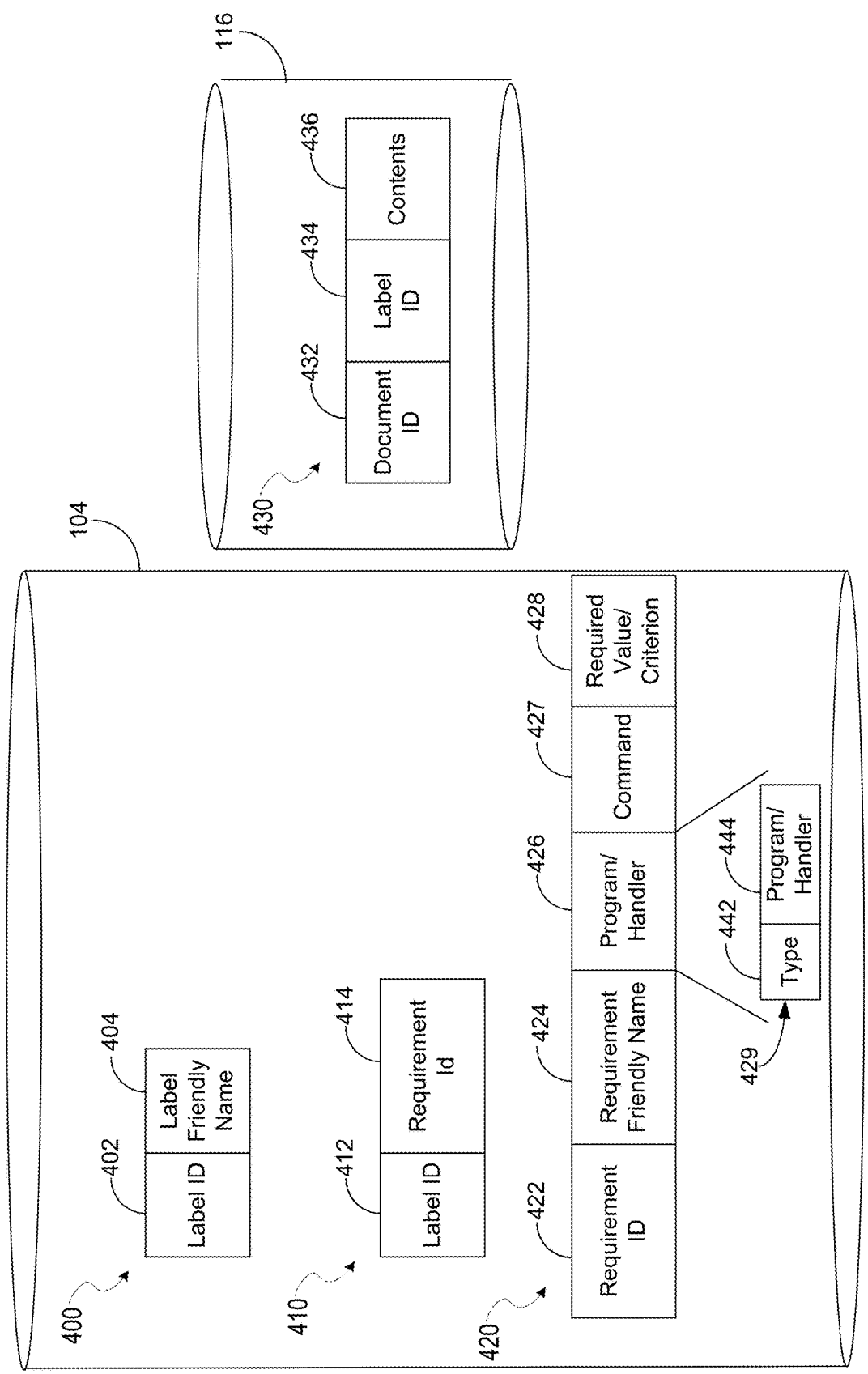
FIG. 4 shows example data structures that may be implemented in one or more of the disclosed embodiments.

FIG. 4 shows example data structures that may be implemented in one or more of the disclosed embodiments. FIG. 4 shows the label configuration data store 104, discussed above with respect to FIG. 1 and FIG. 2. The label configuration data store 104 includes a label table 400, label requirements table 410, and a requirements table 420.

The label table 400 includes a label identifier field 402 and a label friendly name field 404. The label identifier field 402 uniquely identifies a particular label. The label identifier field 402 may be cross referenced with other label identifiers in the label configuration data store 104. The label friendly name field 404 provides a name that may be presented in a user interface for the label. The user interface may be displayed by the admin user interface module 208, discussed above with respect to FIG. 2. The label requirements table 410 maps particular labels to particular requirements.

The label requirements table 410 includes a label identifier field 412, and a requirements identifier field 414. The label identifier field 412 may be cross referenced with other label identifiers in the label configuration data store 104. The requirement identifier field 414 uniquely identifies a particular requirement for a document when labeled with a label identified by the label identifier field 410. As discussed above, a requirement specifies a particular state of a particular document property. The identified requirement may include content requirements and/or security requirements, and/or message requirements. Examples of content requirements include a requirement for a document to have a particular watermark (e.g. document property=background, state=particular watermark), a particular header, or a particular footer. An example of an encryption requirement is that the document be encrypted using a particular encryption algorithm, or an encryption algorithm meeting certain minimum requirements. An example of a message requirement relates to email messages.

In some aspects, one of the devices 102a or 102b may be unable to render a body of an email message in a requirement format. For example, the label may require the email body to be encoded in rich text format (rtf), but the device 102a may be unable to render this format. Thus, the body of the email may be encoded as text when sent from the device 102a to the document labeling system 108. The document labeling system 108 may then convert the body from text to rtf based on a label assigned to a document defining the email body.

The label configuration data store 104 also includes a requirement table 420. The requirements table 420 includes a requirement identifier field 422 a requirement friendly name field 424, a program/handler field 426, a command field 427 and a required value or criterion field 428. The requirement identifier field 423 uniquely identifies a requirement and may be cross referenced with other requirement identifies of the data store 104. The requirement friendly name field 424 defines a human language readable name for the requirement identified by the requirement identifier field 422. The program/handler field 426 defines a software program or script that is capable of modifying a document to comply with the requirement. In some aspects, the program field 426 defines a file name of the software program or script. In some aspects, the program/handler field 426 includes the program itself (e.g. instructions implementing an algorithm to perform the modification necessary to comply with the requirement. In some embodiments, the program/handler field 426 defines programs/handlers that are document type specific. For example, in some embodiments, the program field 426 specifies different software programs or "handlers" for different types of documents, as illustrated by table 429 shown in FIG. 4. Table 429 includes one or more rows including a type field 442 and a program/handler field 444. The type field 442 identifies a type of document for which the program/handler specified by field 444 applies. In some embodiments, a program/handler specified by the program handler field 444 is equivalent to a default handler program specified by an operating system for a type of the document. For example, a word processing program (e.g. winword.exe) is specified for word processing type documents (e.g. docx), and a spreadsheet processing program (e.g. excel) is specified for spreadsheet type document (e.g. xls). The command field 427 specifies a command to provide to the program/handler specified in the field 426 in order to effect a change to the document such that it meets the requirement. In some embodiments, the command field 427 specifies command line parameters to pass to the specified program/handler. In some embodiments, the command field 427 includes a table similar to table 429, but specifying particular commands for each of one or more document types.

The requirement value/criterion field 428 stores data indicating a value of a particular document property that corresponds to the requirement. For example, the requirement defines, in some embodiments, that a particular document property must be consistent with a particular value, and the particular value is stored in the required value/criterion field 428 in these aspects. In some other embodiments, the requirement defines, in some embodiments, that a particular document property meets one or more criterion. In these embodiments, the required value/criterion field defines the one or more criterion.

The document data store 116 includes a document table 430. The document table 430 includes a document identifier field 432, document label identifier field 434, and document contents field 436. The document identifier field 432 uniquely identifies a document. The label identifier field 434 identifies a label assigned to the document. The label identifier field 434 may be cross referenced with any of the label identifiers discussed above with respect to the label configuration data store 104. The document table field 430 also includes a content field 436. The contents field 436 defines contents of the document identified by the document identifier 432. Modifications made to the document to conform with the assigned label (e.g. 434) may modify data stored by the content field 436.

Figure 5A:
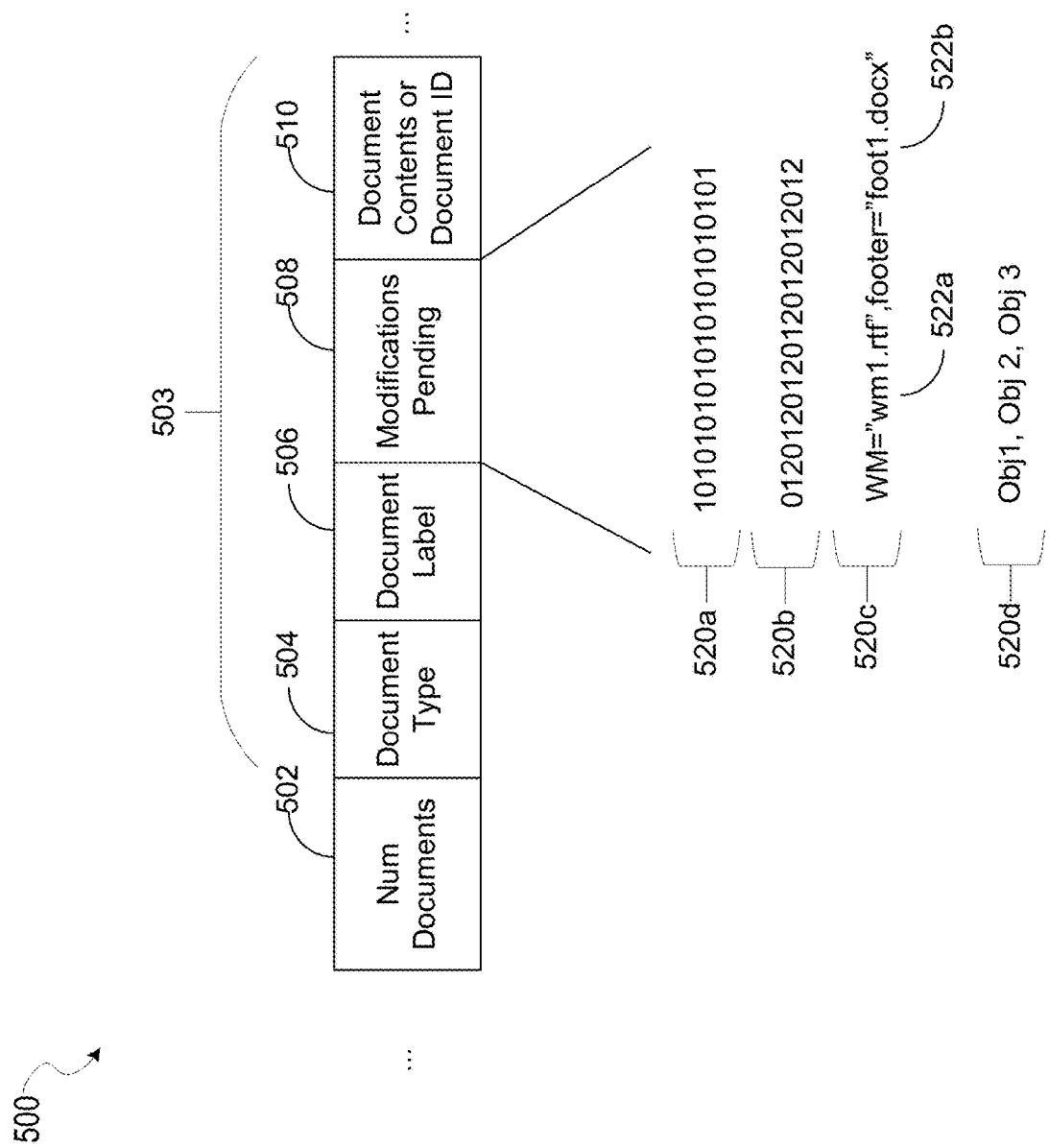
FIG. 5A is an example message portion that may be implemented in one or more of the disclosed embodiments.

FIG. 5A is an example message portion that may be implemented in one or more of the disclosed embodiments. FIG. 5A shows a message portion 500, that may be include in one or more of the messages 122a and/or 122b, discussed above with respect to FIGS. 1-2. In some embodiments the message portion 500 is configured to instruct the document labeling system 108 to complete a remaining portion of modifications to a document that are necessary to cause the document to conform with requirements of a label assigned to the document.

The message portion 500 includes a number of documents field 502. The number of documents field 502 indicates a number of document sections 503 included in the message portion 500. Each document section 503 defines a document referenced in the message portion 500. Each document section 503 includes a document type field 504, document label field 506, a modifications pending field 508, and a document contents or document identifier field 510. The document type field 504 indicates a type of document referenced in a particular document section 503. The document type field 504 may indicate, for example, whether the document defines an email body or an email attachment.

The document label field 506 indicates a label assigned to the document. The document label field 506 may identify a label identifier (e.g. 402, 412) for the label configuration database 104. Some embodiments may not include a document label field 506. In these embodiments, the document label may be obtained from the document table 430, discussed above with respect to FIG. 4. For example, a document id may be included in the document section 503 that provides for identifying the document in the document table 430, as discussed further below.

The document section 503 also includes a modifications pending field 508. The modifications pending field 508 indicates modifications to the document identified by the document section 503 that need to be made to the document to conform the document with requirements of the assigned label (e.g. 412 or 434). In other words, the modifications pending field 508 describes a gap between requirements on the document imposed by the label of field 506, and a current state of the document as the document is represented by the field 510, discussed further below.

The modifications pending field 508 may, in some aspects, list requirement identifiers as described above with respect to FIG. 4. The requirement identifiers listed in the modifications pending field 508 may be a subset of requirements of the label assigned to the document For example, if a particular label assigned to a particular document requires the document to conform to requirements A, B, and C, perhaps requirement A is satisfied by modifications made to the document by a device sending the message 500 (such as device 102a or device 102). However, in this example, the sending device may be unable to perform modifications to the document to have it conform to requirements B and C. In this example, the modifications pending field 508 indicates requirements B and C.

Also shown in FIG. 5A are example formats of the modifications pending field 508, labeled as 520a, 520b, 520c, and 520d. Example format 520a shows the modifications pending field 508 as a series of binary indicators. Each binary indicator in the series may be assigned or mapped to a particular modification. A mapping between indicators in the series and modifications would be predetermined and known by devices operating within the disclosed embodiments. For example, the devices 102a-b and the document labeling system 108 would be aware of the mapping. Thus, for example, a first indicator may indicate whether a watermark of a particular type needs to be added to the document. In some embodiments, if the indicator was set, the watermark still needs to be added, while if the indicator is zero, no watermark needs to be added. The indicator might be zero in this example embodiment if either a label of the document does not require the watermark, or the watermark has already been added (or was already present) in the document.

In a second example embodiment, labeled 520b, each position in a modification mapping may include one of three values. In the second embodiments, these three values are illustrated as zero (0), one (1), or two (2), but in various embodiments could utilize any three values. One of the three values indicates that the modification mapped to the position is not needed for the document's assigned label. A second value of the three values indicates that the modification is needed, but has already been performed on the document. A third value of the three values indicates that the modification is needed, and still needs to be performed. Thus, this third value indicates a difference between the document's current state and a state necessary to conform with the document's assigned label. Note that in embodiments implementing modification indicators having at least three different values as illustrated with embodiment 520b, at least two bits per indicator will be required.

A third example embodiment is labeled as 520c, and includes a comma separated list of modifications pending to conform the document with requirement(s) of its assigned label. The third embodiment differs from embodiments labeled 520a and 520b discussed above in that the data included in the modifications pending field 508 includes some specification of the modifications themselves, and does not rely 100% on predefined mappings known by the devices as described above with respect to the first and second example embodiments.

For example, as shown, the embodiment 520c shows specifications for particular modifications. As shown, a first modification of a comma separated list of modifications, labeled 522a specifies a particular file name to use as a watermark for the document. The particular file name specified may be included in the message 500 in some aspects. In other aspects, the particular file name specified may be a common file name shared across devices operating in the disclosed embodiments. For example, the common file name may be accessible in a directory accessible by the document labeling system 108. Alternatively, the file identified by the file name may be available in the label configuration data store 104.

The third embodiment 520c also illustrates a second modification separated from the first modification by a comma (","). The second modification 522b indicates a footer needs to be added to the document (a modification). The modification 522b also specifies a file name for the footer. As above, the file name for the footer may be available in a location common to devices operating in the disclosed embodiments. In some aspects, the footer file "foot1.docx" may be available in the label configuration data store 104. In some other aspects, content for the indicated modifications may be specified in other manners than the file name examples provided here. For example, in some aspects, the content may be included in the message 500 itself. For example, instead of specifying "footer=foot1.docx" (filename) as described above, the field 508 specifies footer="footer text:, where the actual text itself that should be added to the document's footer is specified in the field 508. In some other embodiments, the content may be specified via an identifier of a database table, or database table entry.

A fourth embodiment identified as 520d specifies an object for each pending modification. The fourth embodiment may use object mobility technology to indicate objects that when run, perform the pending modifications on the document. Alternatively, the fourth embodiment may specify a remote object reference for each pending modification. Invocation of the remote object modifies the document to be consistent with a requirement of the document's label.

Figure 5B:
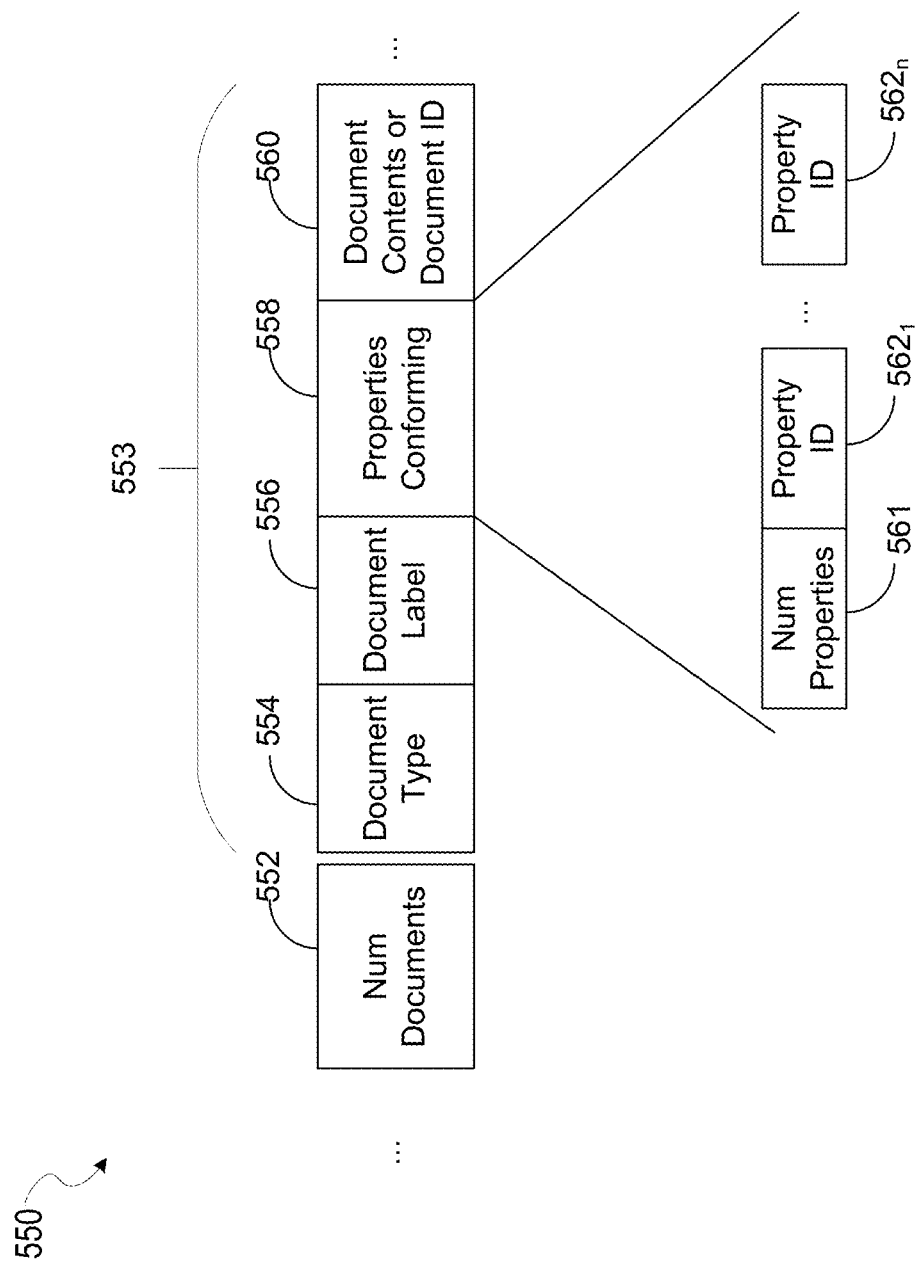
FIG. 5B is an example message portion that may be implemented in one or more of the disclosed embodiments.

FIG. 5B shows an example message portion that may be implemented in one or more of the disclosed embodiments. FIG. 5B shows a message portion 550, that may be include in one or more of the messages 122a and/or 122b, discussed above with respect to FIGS. 1-2. In some embodiments the message portion 550 is configured to instruct the document labeling system 108 to complete a remaining portion of modifications to a document that are necessary to cause the document to conform with a label assigned to the document.

The example message portion 550 includes a number of documents field 552. The number of documents field 552 indicates a number of document sections 503 included in the message portion 550. Each document section 553 defines a document referenced in the message portion 550. Each document section 553 includes a document type field 554, document label field 556, a properties conforming field 558, and a document contents or document identifier field 560. The document type field 554 indicates a type of document referenced in a particular document section 553. The document type field 554 may indicate, for example, whether the document defines an email body or an email attachment.

The document label field 556 indicates a label assigned to the document. The document label field 556 may identify a label identifier (e.g. 402, 412) for the label configuration database 104. Some embodiments may not include a document label field 556. In these embodiments, the document label may be obtained from the document table 430, discussed above with respect to FIG. 4. For example, a document id may be included in the document section 553 that provides for identifying the document in the document table 430, as discussed further below.

The document section 553 also includes a properties conforming field 508. The properties conforming field 558 indicates properties of the document that conform with requirements of the label identified by the label field 556. In some other embodiments, the properties conforming field 558 may instead be a properties not conforming field, identifying properties of the document that do not conform with requirements of the label. In some other embodiments, the properties conforming field 558 is instead a modified properties field, indicating properties of the document that were modified by a device transmitting the message portion 550 so as to conform those properties to requirements of the label (e.g. meet one or more criterion defined by the label). Thus, the field 558 may identify some properties that conform to the label (e.g. meet criterion of requirements for the label), but may not identify all properties of the document that already conform to the label. In some embodiments, the properties conforming field 558 (or its variants discussed above) include a number of properties field 461, and one or more property identifier fields $562_{1 \ldots n}$. The number of properties field 461 counts a number of properties identified in the fields $562_{1 \ldots n}$ (e.g. defines n). Each of the property identifier fields $562_{1 \ldots n}$ identifies a particular document property that conforms with requirements of the label. For example, some embodiments may define a mapping between a plurality of document properties and identifiers. For example, a footer property is assigned a first identifier and an encryption level property of the document is assigned a second identifier. These identifiers are included in the message to communicate between a client device (e.g. 102a or 102b) and a document labeling system (e.g 108) which properties of a communicated document conform with the label defined in field 556. This allows a receiving device to further augment any processing of the document performed by the client device as needed so as to complete modifications necessary to cause the document to comply with requirements of the label, as further discussed below. Thus, the properties conforming field 558 communicates a gap between a current document state, such as a state of the document contents included in the field 560, discussed below, and a state required by the label 556. Note the state may include requirements for a plurality of document properties to meet a plurality of criterion and/or have a plurality of particular values.

The message 550 also includes the document contents field 560, which includes data defining the document itself, or alternatively, defines a reference to a data store that stores the contents of the document.

Figure 6:
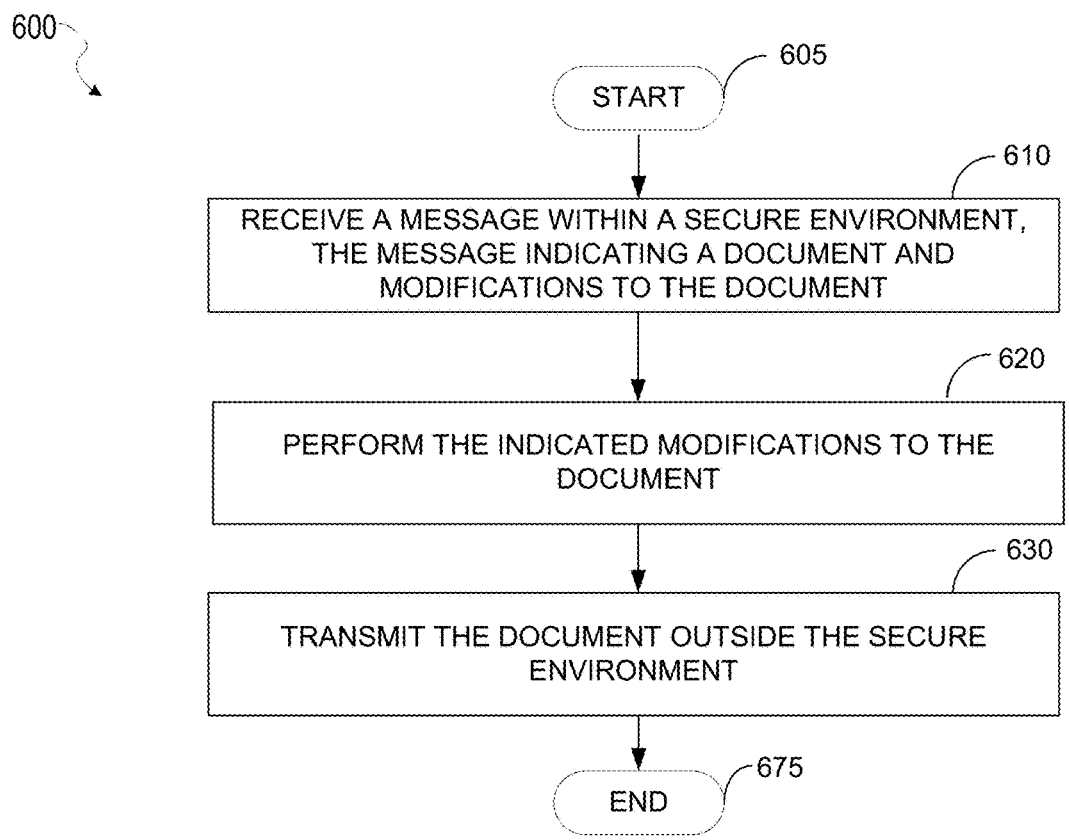
FIG. 6 is a flowchart of a method of labeling an electronic document.

FIG. 6 is a flowchart of a method of labeling an electronic document. In some aspects, one or more of the functions discussed below with respect to FIG. 6 and process 600 may be performed by hardware processing circuitry. For example, the instructions 924 discussed below in the memory 904 and/or 906 may configure the processor 902 to perform one or more of the functions discussed below. In some aspects, the process 600 discussed below may be performed by the adaptive document processing module 206 discussed above with respect to FIG. 2. In some aspects, process 600 may be performed by the document labeling system 108, discussed above with respect to FIG. 1.

After start block 605, process 600 moves to operation 610. In operation 610, a message is received within a secure environment. The message indicates a document and modifications to the document. The document has an assigned label. The assigned label may also be indicated in the message.

The secure environment (e.g. 106) may be provided within an enterprise. For example, as discussed above with respect to FIG. 1, the secure environment 106 may include an email client device, such as the device 102a, and may also include a server-based device, such as the document labeling system 108. The server-based system may be an email server in some aspects, but may alternatively be a web server in some other aspects, or other server-based system.

In some embodiments, the message received in operation 610 may include one or more of the fields discussed above with respect to message portion 400 of FIG. 4. As discussed above with respect to FIG. 6, in some aspects, the received message may indicate modifications to the document that should be performed in order to conform the document with a label assigned to the document. In some other embodiments, the message may indicate modifications to the document already performed. For example, in some aspects, a device sending the message of operation 610 may have already performed some operations on the document before sending the message. In either embodiment, the message indicates pending modifications to the document.

In operation 620, the pending modifications to the document are performed. The message received in operation 620 may indicate which requirements are already met by the document, or may indicate which requirements remain to be met (pending modifications) by the document. Alternatively, the message 620 could indicate both sets of requirements (met and unmet).

For example, a document may be assigned a label that defines three requirements. The document may already conform with at least one of the requirements when the document is received in operation 610. In this particular example, two requirements may then be performed in operation 620. The pending modifications may include content modifications to the document. For example, content modifications may include adding content to the document (e.g. adding a header and/or footer to the document, adding a watermark to the document), changing a document format of the document (e.g, from .docx format to .rtf format), and/or adding password protection to the document.

As one example, popular word processing programs may provide for password protection of a document. The password assigned to a document may further control encryption of the document. The encryption may use the password as an encryption/decryption key. Some labels may require password protection of the document. This password may have already been added to the document before it is received in operation 610. In other cases, while a label of the document may require password protection, the document may not yet be password protected when received in operation 610. In these cases, operation 620 may add the password protection to the document.

In operation 630, the modified document is transmitted outside the secure environment. For example, as discussed above with respect to FIG. 1, the document labeling system 108 transmits the document to a device external to the secure environment 106, such as either of the devices 110a or 110b. Note that while the document received in operation 610 does not conform with its assigned label, the modified document transmitted in operation 630 does conform with its assigned label, based at least on the modifications made to it in operation 620. In some other aspects of process 600, the document received in operation 610 may already conform to its assigned label. For example, if the device sending the message of operation 610 is capable of all modifications to the document necessary to conform the document to its label, the document may be received in operation 610 already conforming with the assigned label. In these embodiments, the message indicates no additional modifications to the document are necessary, and thus operation 620 may perform no additional operations. After operation 630, process 600 moves to end operation 675.

Figure 7:
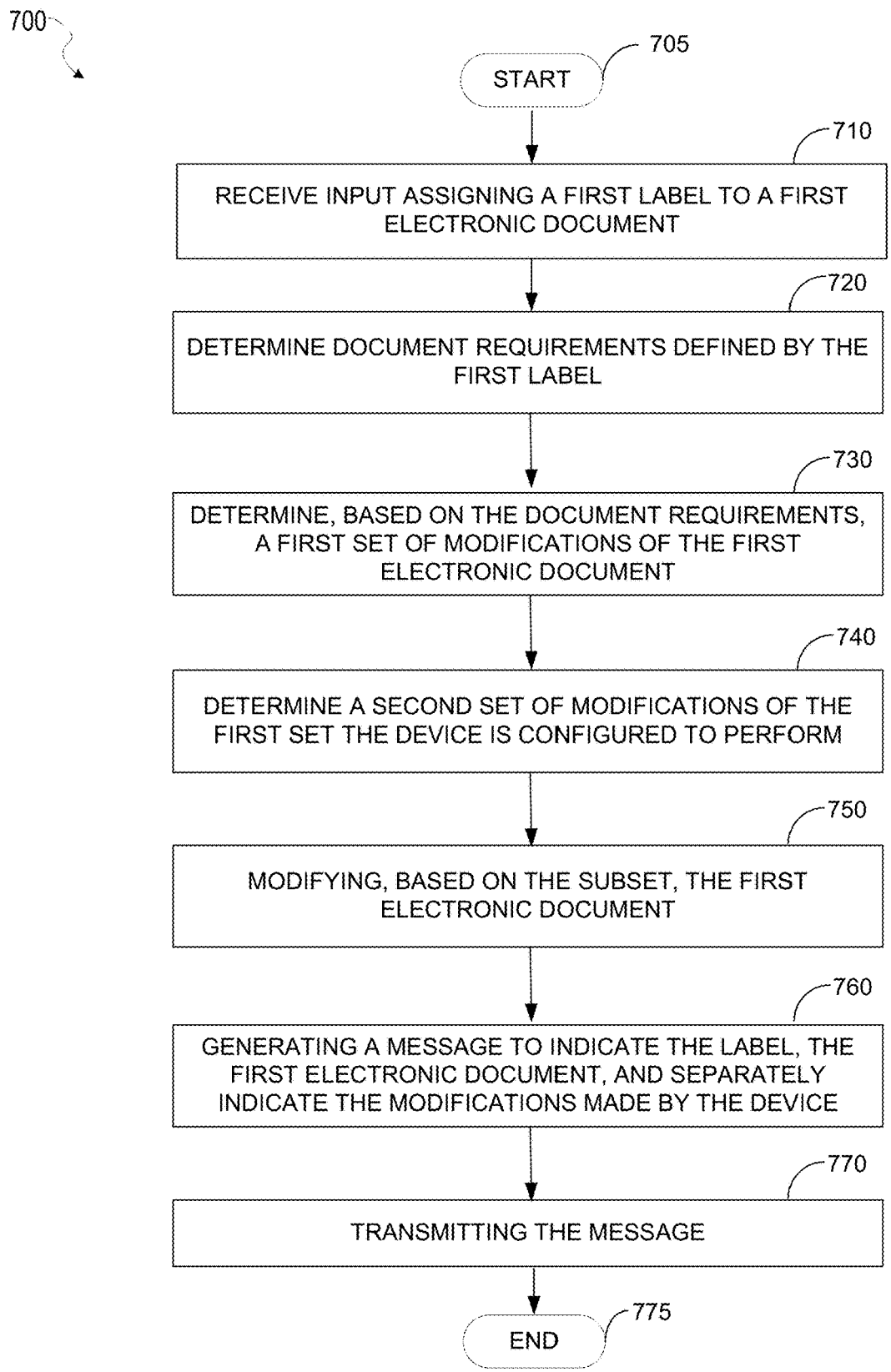
FIG. 7 is a flowchart of a method of labeling an electronic document.

FIG. 7 is a flowchart of a method of labeling an electronic document. In some aspects, one or more of the functions discussed below with respect to FIG. 7 and process 700 may be performed by hardware processing circuitry. For example, the instructions 924 discussed below in the memory 904 and/or 906 may configure the processor 902 to perform one or more of the functions discussed below. In some embodiments, one or more of the functions discussed below with respect to FIG. 7 are performed by the device 102a and/or device 102b. In the discussion of FIG. 7 below, a device performing one or more of the functions discussed below with respect to FIG. 7 is referred to as an executing device.

After start operation 705, process 700 moves to operation 710. In operation 710, input is received. The input indicates a first label of a first electronic document. The input indicates, in some embodiments, that the first label has been assigned to the first electronic document. In some embodiments, the input is received from a user interface For example, the user interface may be displayed by a client device, such as any of the client devices 102a-b discussed above with respect to FIG. 1. Some embodiments of operation 710 assign the first label to the first electronic document.

For example, a label of "public," "classified," "top secret, ", or "privileged" may be assigned to the document in various embodiments. Assignment of the label to the document imposes certain requirements on the document. As discussed above, some labels may require the document to include a certain header, footer, watermark, or other content. Some labels may require the document to be encrypted using a particular encryption algorithm, or at least encrypted using an encryption algorithm meeting certain minimum requirements. Some document labels may require the document to be stored in particular document formats.

In operation 720, requirements of the document defined by the first label are determined. For example, as discussed above, requirements for a particular label may be defined n a label configuration data store. As one example discussed above with respect to FIG. 4, the label configuration data store 104 may include a label requirements table (e.g. 410) that maps labels (e.g. 412) to one or more requirements (e.g. 414). In the example of FIG. 4, there may be multiple rows in the label requirements table 410 for a single label id 412 when the label is mapped to multiple requirements.

In operation 730, a first set of modifications of the first electronic document are determined based on the requirements. Thus, for example, if the label requires the document to include a particular footer, and does not currently include the particular footer, then a modification is needed to make the document conform with the requirements of the label. Similarly, if the label requires a certain watermark, and the document already includes the watermark, then no further modifications are necessary, at least with respect to this requirement of the label. Thus, operation 730 may analyze a current state of the document to determine which of the requirements are already met and which requirement of the label are not met by the document in its current state. In some other embodiments, there may be a one to one mapping between requirements and modifications necessary.

In operation 740, a second set of modifications the executing device is capable of, or configured to perform, is determined. The second set of modifications is based on the first set. In some aspects, the second set may be a subset of the first set. In some aspects, the second set includes zero modifications. In some embodiments, the second set includes all the modifications included in the first set. For example, the first set of modifications may include at least N number of modifications, while the second set of modifications consists of N-K modifications (e.g. fewer modifications than the first set of modifications).

In other words, the device performing process 700 determines whether it can make or perform each of the modifications identified in operation 730, or what portion of the modifications it can perform. As discussed above, some modifications may require particular programs be resident on the executing device. As one operative example, if the document is of a particular type, adding a watermark to the document may require a program capable of parsing a document format for the particular type, and inserting data defining the watermark based on the parsing of the document format. Some executing devices may not have this capability. For example, they may not have a software program installed that understands or is configured to parse the document format, and are thus unable to perform the modification. To determine which modifications the executing device can perform, the executing device consults, in some embodiments, a requirements table, such as requirements table 420 discussed above with respect to FIG. 4. In some embodiments, the requirements table defines programs necessary to affect each of the modifications and/or requirements. For example, if a requirement is that a document footer (e.g. a property of the document) having particular text (e.g. a particular property value or state as discussed above with respect to FIG. 3), a corresponding modification is to modify the document footer to have the particular text. The requirements table defines, in some embodiments, one or more programs/handlers necessary to affect the modification such that the document meets the requirement. The executing device can then determine whether any specified handler/program is resident on the executing device or otherwise assessable from the executing device such that the modification can be made by the executing device.

Alternatively, in some embodiments, an executing device does not have physical access to data required to make the modification. To continue with the example above, an executing device may be capable of adding the watermark. However, data defining the watermark may be unavailable at the executing device. Thus, in this example, this modification, determined in operation 730, is not performed by process 700.

In some embodiments, operation 740 may determine the executing device is capable of or configured to perform a second modification that was determined in operation 730.

In some aspects, the executing device may be capable of or configured to perform all of the requirements of the label. Thus, the subset described with respect to 740 may be equivalent to the set of modifications determined in operation 730.

In operation 750, the first electronic document is modified based on the second set of modifications determined in operation 740. Thus, for those modifications that the executing device is capable of or configured to perform, the executing device performs those modifications.

In operation 760, a message is generated. The message is generated to indicate the modifications made by the executing device to the document. The message may alternatively or in addition to, indicate modifications that still need to be made to the document in order for the document to comply with its assigned label. In some aspects, the message generated in operation 760 may include one or more of the fields discussed above with respect to message 500. The message separately indicates the modifications in that the document itself is not used to indicate the modifications, but instead the message explicitly defines modifications already made and/or modifications needed to yet be made in order to have the document comply with its assigned label. In other words, the message identifies gaps between the document in its present state and requirements for its assigned label. As discussed above, the requirements for the assigned label may be defined by a label configuration data store 104.

In operation 770, the message is transmitted. The message may be transmitted, in some aspects, to a document labeling system 108. For example, the message can be transmitted, in various embodiments, to a single device implementing the document labeling system 108, or a cloud-based network service implementing same. A destination device of the message may be configured to augment the document with any modifications that could not be performed by the executing device. In other words, the destination device for the message of operation 770 fills in any gaps between the document as indicated by the message and requirements of its assigned label. The message transmitted in operation 770 is configured to instruct a receiving device or service to complete a remaining portion of modifications necessary to conform the document with requirements implied by its respective label.

With respect to process 700 and FIG. 7, in some embodiments, a single modification is required to conform the electronic document with its label. In these embodiments, perhaps the executing device performs this modification. In this case, the message transmitted in operation 770 indicates that no further modifications are necessary to conform the document to its label, since the executing device performs all modifications necessary. However, the message would still indicate, depending on the embodiments, modifications made or modifications necessary to be made (e.g. consistent with the spirit of either FIG. 5A or 5B one of which would indicate no modifications). In some other embodiments, a single modification is required, but the executing device is not configured to perform the modification. In this case, the executing device performs no modifications, but indicates, via the message of operation 770, the single modification needs to be performed by the entity (service/device) receiving the message. These example embodiments or situations still represent subject matter, in that the system is still operating in a manner that dynamically determines which modifications necessary are performed by the executing device (e.g. client device) and which modifications are performed by the back-end processing entity (e.g. network service, cloud-based service, back-end server, etc).

Similarly, in some cases, no modifications to the document are necessary to conform the document with the label. In this case, the executing device determines no modifications are necessary, and indicates, in a message consistent with the spirit of either FIG. 5A or 5B in some embodiments, that either no modifications were made, or no modifications are necessary. The receiving device/service then performs actions consistent with the message. This also represents inventive subject matter because the example embodiment is still dynamically determining a set of modifications necessary and distributing those modifications between at least the executing device and a remote service/device to distribute the processing load as discussed above.

In some embodiments two or more modifications are required to conform the document with its requirements, with at least one modification made by the executing device and at least one modification made by an embodiment of the document labeling system 108, such as by a remote network device or network service, as discussed above.

Figure 8:
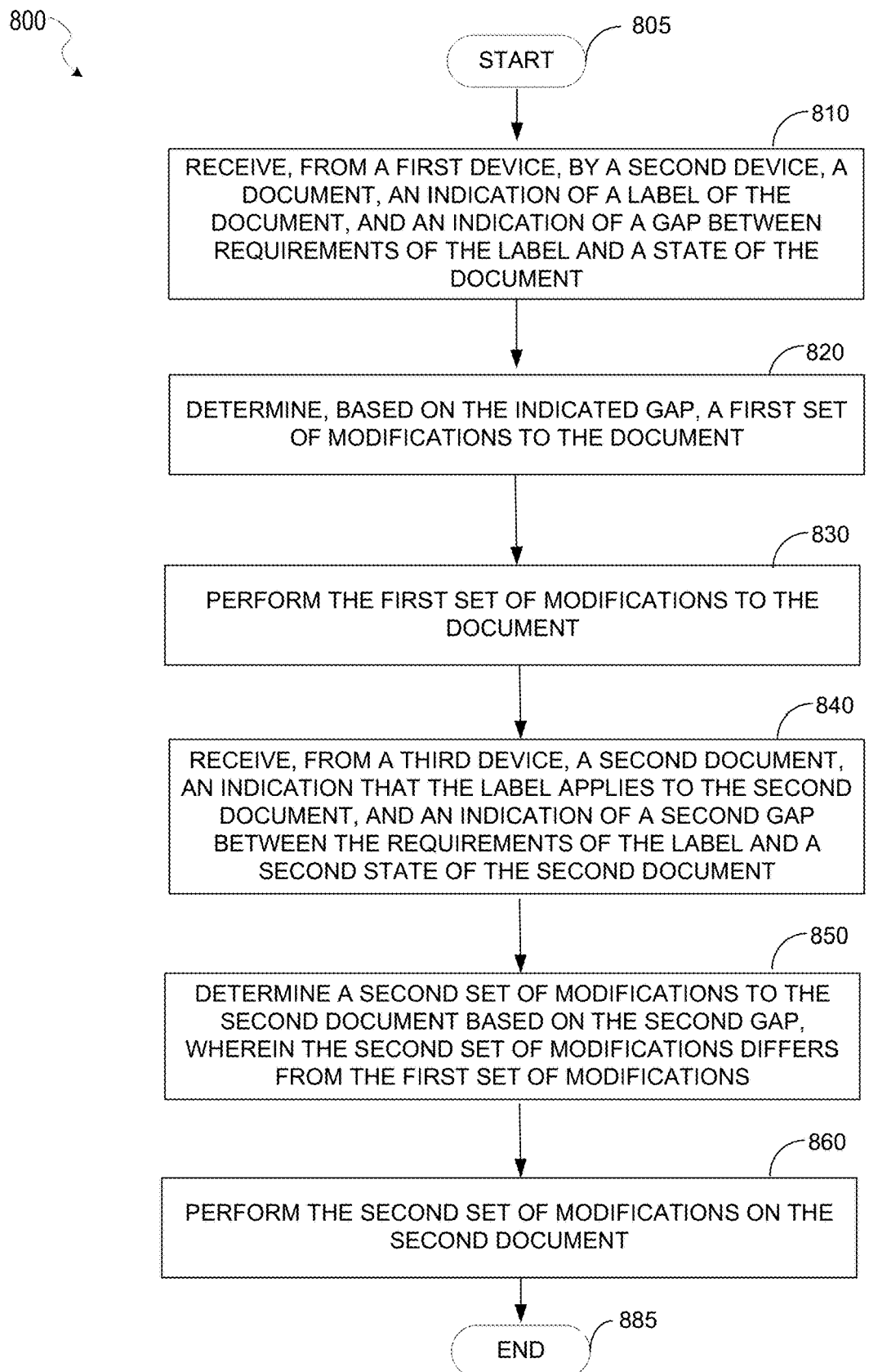

FIG. 8 is a flowchart of a method of labeling an electronic document. In some aspects, one or more of the functions discussed below with respect to FIG. 8 and process 800 may be performed by hardware processing circuitry. For example, the instructions 924 discussed below in the memory 904 and/or 906 may configure the processor 902 to perform one or more of the functions discussed below. In some aspects, the process 800 discussed below may be performed by the adaptive document processing module 206 discussed above with respect to FIG. 2. In some aspects, process 800 is performed by the document labeling system 108, discussed above with respect to FIG. 1. In some embodiments, a device performing process 700 and a separate device or service performing process 800 work together to implement a document labeling solution, with process 700 performing at least one modification to the document and process 800 performing at least one modification to the document.

After start block 805, process 800 moves to operation 810. In operation 810, a document is received from a first device. In some embodiments, the first device is equivalent to the client device 102a or 102b. In some embodiments, the document is received via a network in a network message, such as a message including one or more of the fields described above with respect to example message(s) 500 and/or 550 discussed above with respect to FIGS. 5A-B. In some of these embodiments, the document is received valid field 510 or 560. Operation 810 also receives an indication of a label for the document (e.g. 506 or 556). For example, the label can indicate, in various embodiments, whether the document is labeled as public, private, classified, secret, confidential, restricted, or other label. For example, as discussed above, the label indicates one or more requirements for the document. Each requirement indicates, in at least some embodiments, a particular state of a particular property of the document. In operation 810, an indication of a gap between requirements of the label and a state of the document is also received (e.g. 508 or 558). The indication of the gap indicates, in some embodiments, a set of modifications to the document that are necessary in order for the document to conform with the label. For example, the gap indicates, in some embodiments, a set of state transitions for a corresponding set of document properties that are necessary to conform the document to the label.

In operation 820, a first set of modifications to the document are determined based on the gap. In some embodiments, the modifications are indicated by a network message such as the message 500 and/or message 550 discussed above with respect to FIGS. 5A-B. In some other embodiments, the set of modifications is determined by identifying changes to one or more document properties necessary to move the document into a document state (consisting of a plurality of document property states) that is consistent with the label. For example, as discussed above with respect to FIG. 4, a label represents a set of requirements for one or more document properties. The requirements specify a particular state of one or more document properties. Note the first set of modifications may include at least 1, 2, 3, 4, 5, 6, 7, 8, 9, 10, or any number of modifications. Each of the modifications corresponds with a different document property.

In operation 830, the first set of modifications are performed on the document. For example, the modifications may include modifying content of the document, such as one or more of a header (e.g. a first property), footer (e.g. a second property), or watermark (e.g. a third property). In some embodiments, the modifications also includes modifying a property of the document such as encryption level, password, or other property of the document. Some embodiments of operation 830 include storing the modified document to a data store and/or writing the modified document to an output device, such as a hard disk, network interface, display screen, or other output device.

In operation 840, a second document is received from a third device. The third device is a client device (e.g. 102a or 102b) in some embodiments. The second document is received in a message in some embodiments, such as a message including one or more of the fields discussed above with respect to message portion 500 and/or 550. The second document is also indicated to be associated with the label (i.e. the same label with which the first document is associated). Operation 840 also includes receiving an indication of a second gap between a second state of the second document and the requirements of the label. The second gap is different than the first gap. In other words, both the first and second documents are associated with or assigned the same label. For example, both the first and second documents are labeled confidential in some embodiments. However, the first and second documents are received in different states. For example, a first plurality of document properties of the first document have a corresponding plurality of values. When received, the second document has a different second set of values for the first plurality of document properties. A device executing process 800 conforms this first plurality of document properties for each of the first and second document with those property values defined by the label, regardless of the state of the respective document when it is received by the executing device.

In operation 850, a second set of modifications to the second document are determined based on the indicated second gap. The second set of modifications are different than the first set of modifications. For example, since the state of the first document and second document are different when they are received by a device executing process 800, different modifications to the respective documents are needed to conform each of the documents to requirements of the label. The label is common for both the first and second document. Note the set of modifications may include at least 1, 2, 3, 4, 5, 6, 7, 8, 9, 10, or any number of modifications. Each of the modifications corresponds with a different document property.

In operation 860, the determined second set of modifications are performed on the second document. Some embodiments of operation 860 include storing the modified second document to a data store and/or writing the modified second document to an output device, such as a hard disk, network interface, display screen, or other output device.

Figure 9:
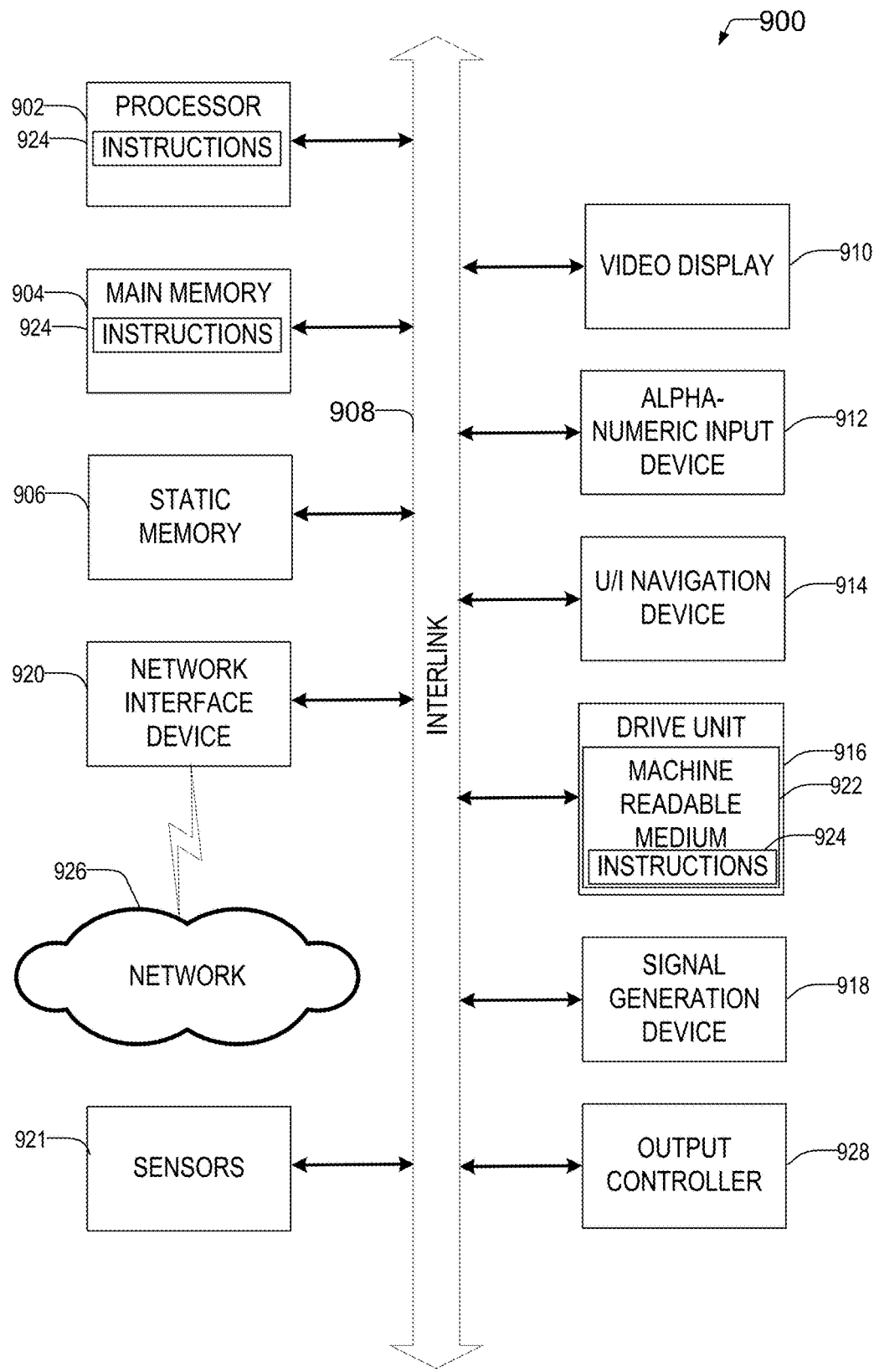
FIG. 9 illustrates a block diagram of an example machine upon which any one or more of the techniques (e.g., methodologies) discussed herein may perform.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 900 may perform one or more of the processes described above with respect to FIGS. 1-8 above and/or FIG. 10 below. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 924 may further be transmitted or received over a communications network 926 using a transmission medium via the network interface device 920. The machine 900 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques.

Figure 10:
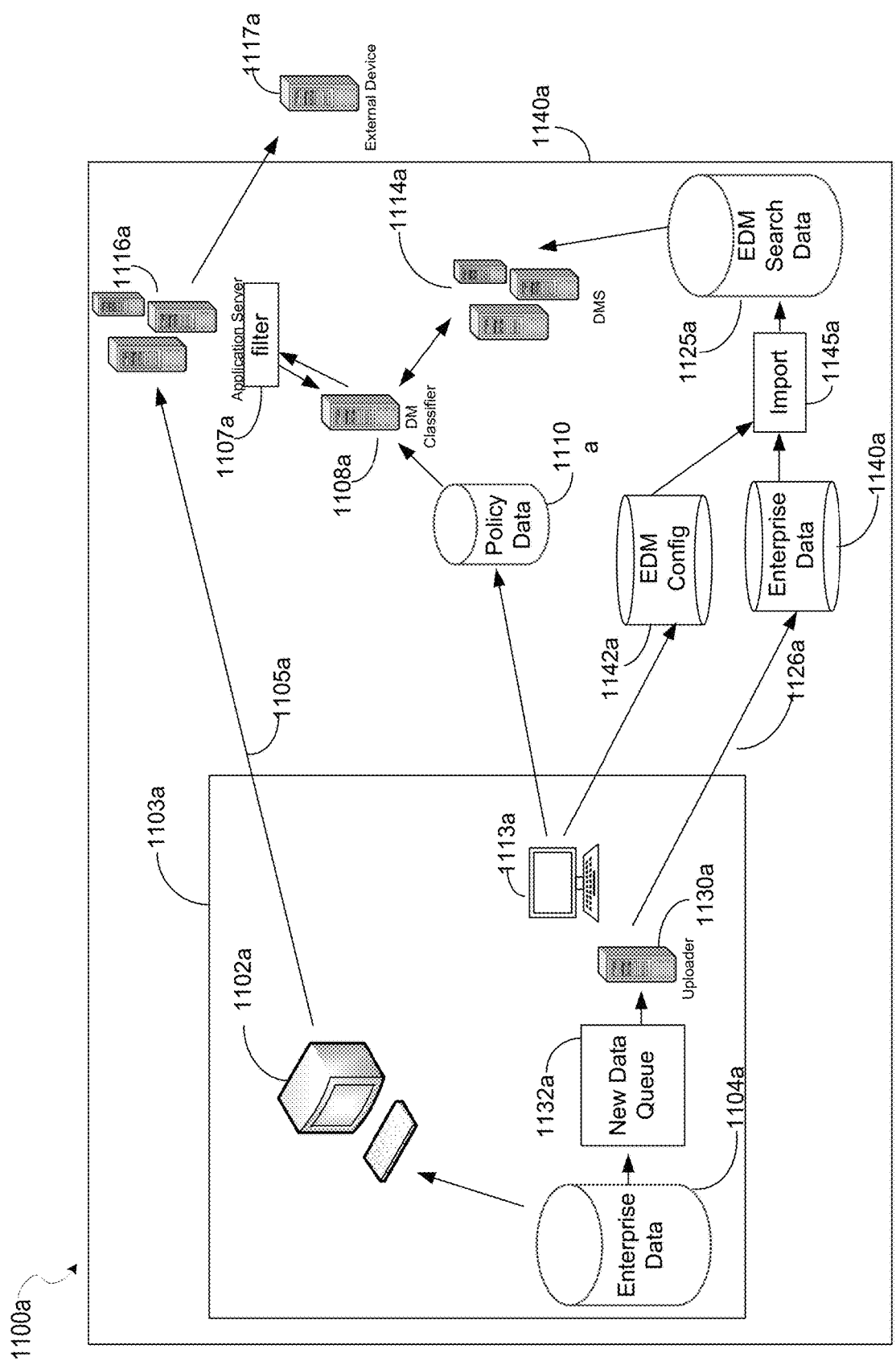
FIG. 10 is an overview of a networked system, at least a portion of which may be implemented by one or more of the disclosed embodiments.

FIG. 10 is an overview of a networked system, at least a portion of which may be implemented by one or more of the disclosed embodiments. The networked system 1100a includes an on-premises enterprise environment 1103a, along with remote cloud-based IT resources such as the application servers 1116a. The on-premises enterprise environment 1103a includes a user terminal 1102a. The user terminal 1102a has access to enterprise data, including sensitive data stored in an enterprise data store 1104a. As discussed above, the disclosed embodiments provide for monitoring and control of data leaving the enterprise 1103a.

The user terminal 1102a sends network data 1105a to a remote application server 1116a. The remote application server 1116a includes a filter 1107a, which intercepts the network data 105a sent to the remote application server 1116a. The user terminal 1102a may send data to the remote application server 1116a for a variety of reasons. For example, the network data 1105a may be at least a portion of an email message, and the remote application server 1116a may implement an email application service. The network data 1105a may alternatively represent a document being uploaded to a web site or remote storage that facilitates sharing of data among multiple users (e.g. Sharepoint™, Box™, etc). In these embodiments, the data 1105a may be included in an HTTP Post type message.

Once the network data 1105a has been transferred to the application server 116a, it may be at risk of being exposed outside the secure environment 1140a. For example, in the case of the application server 1116a implementing an email application, the client device 1102a may attempt to send the network data 1105a as part of an email message to the external device 1117a. In the case of the application server 1116a implementing a web site with sharing capability, once the network data 1105a is made publicly available via the web site, it is at risk of being viewed by the external device 1117a.

To determine whether the network data 1105a includes data that is considered sensitive by the enterprise 103a, the data protection filter 1107a transmits the network data 1105a to a data match classifier (DMC) 1108a. The DMC 1108a consults with policy data store 1110a to perform one or more screening methods on the network data 1105a.

Each of the one or more screening methods identify whether the network data 1105a has one or more indications of sensitive information. The screening methods may perform a variety of analysis on the network data to determine whether the network data includes an indication of sensitive information. In some embodiments, the screening methods run by the DMC 1108a may employ one or more of regular expression evaluation and/or keyword matching on the network data. Information defining the regular expressions and/or keywords to be identified in the network data may be obtained by the DMC 1108a from configuration information. In some aspects, regular expressions and/or keywords may be policy specific. The policy may be based on one or more of a time of day, user identifier, group identifier, or other parameters. The policy to apply to the network data 1105a may be obtained from the policy data store 1110a. The policy information included in the policy data store 1110a may be configured via an administrative console 1113a.

The disclosed embodiments may segment the network data into portions, and determine whether each individual portion includes indications of sensitive data. Thus, for example, if the network data 1105a represents a single electronic document, that document may be segmented into multiple portions, and the DMC 108a may determine whether each of the multiple portions includes an indication of sensitive information. While the screening methods do not determine with certainty whether the network data includes sensitive information, they provide an indication of a risk that sensitive information is included in the network data 1105a.

The segmentation of the network data 1105a may be performed using a variety of techniques that may vary by embodiment. In some embodiments, the segmentation may be performed according to size of a particular segment. For example, in these embodiments, each segment, except perhaps a last segment of the network data, may be of equivalent size. Other embodiments may segment data based on contextual knowledge of the network data itself. For example, if the network data represents an electronic document, some embodiments may segment the network data consistent with boundaries with the electronic document, such as along page boundaries, paragraph boundaries, spreadsheet cell, row or column boundaries, or other contextual boundaries that vary by the particular electronic document encoded by the network data.

If a portion of the network data 1105a is determined to present a risk of exposing sensitive information, the DMC 1108a sends the portion to a data matching service (DMS) 1114a via a network, such as the Internet. The DMS 1114a compares the received portion to data in the EDM search data store 1125a.

The EDM search data store 1125a is populated via data flow 1126a from the enterprise data store 1104a located within the enterprise 1103a. In some embodiments, the data from the enterprise data store 1104a to the EDM search data store 125a may be provided by a data upload system 1130a. For example, the data upload system 1130a may hash or encrypt data in the enterprise data store 1104a before uploading the data to the enterprise data store 1140a. An import process 1145a may further process the data before populating the EDM search data store 1125a. The import process 1145a that imports data from enterprise data 1140a to the EDM search data store 1125a may be controlled by configuration information included in an exact data match configuration data store 1142a, which may be configured via user interfaces displayed on the administrative console 1113a.

In addition to analysis of the network data 1105a via one or more screening methods as discussed above, the DMC 1108a may be further configured to determine whether the network data 105a is waiting to be uploaded to the EDM search data store 1125a. For example, the DMC 1108a may check a new data queue 1132a to determine if an upload of the network data 1105a is pending. In these embodiments, new data created within the enterprise 1103a is added to the enterprise data store 1104a and also indicated in the new data queue 1132a. Uploads from the enterprise data store 1104a to the EDM search data store 1125a may be driven by data in the new data queue 1132a by the uploader 1130a. In some embodiments, the uploader 1130a operates periodically, or at least at discrete intervals that introduce some delay between a time that new data is initially created and a time when that data has been successfully transferred to the EDM search data store 1125a. During this delay, this new data may be vulnerable to exposure by the client device 1105a unless remedial measures are taken as described herein.

Thus, the DMC 1108a may check the new data queue 1132a to determine whether the network data 1105a has already been uploaded and can therefore be successfully detected by the DMS 1114a, or if the DMC 1108a should ensure new data is not exposed by the user terminal 1102a. To determine whether new data is restricted from exposure by the user terminal 1102a, the DMC 1108a may check indicators for the data include in the enterprise data store 1104a. For example, the enterprise data store 1104a may indicate whether a particular portion of network data 1104a is restricted from exposure by the user terminal 1102a. If the network data 1105a is restricted, the DMC 1108a may block transmission of the network data 1105a outside the secure environment without consulting the DMS 1114a.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Some of the disclosed embodiments provide for integration of the modification of documents to conform with a label, as described above, with the cloud based document management system described above with respect to FIG. 10. For example, in some embodiments, the client device 1102a performs one or more of the functions discussed above with respect to FIG. 7. The client device 1102a of FIG. 10 is equivalent to the client device 102a discussed above with respect to FIG. 1. The document labeling system 108 discussed above with respect to FIG. 1, is integrated with one or more of the application server 1116a or the uploader 1130a.

Example 1 is a non-transitory computer readable storage medium storing instructions that when executed, configure hardware processing circuitry of a first device to perform operations comprising: receiving input indicating a first label of a first electronic document; determining document requirements defined by the first label; determining, based on the document requirements, modifications of the first electronic document; determining a portion of the modifications the first device is configured to perform; modifying, based on the portion, the first electronic document; generating a message to indicate the label, the electronic document, and separately indicate the modifications made by the first device; and transmitting the message to network service or second device which may be running a network service in some embodiments.

In Example 2, the subject matter of Example 1 optionally includes wherein the input is received from a user interface.

In Example 3, the subject matter of any one or more of Examples 1-2 optionally include wherein determining the document requirements comprises: searching, based on the first label, a data store; determining, based on the search, the document requirements.

In Example 4, the subject matter of any one or more of Examples 1-3 optionally include wherein the first device is a client device, and the message is transmitted to an email server application running on the second device.

In Example 5, the subject matter of any one or more of Examples 1-4 optionally include wherein the modifications include one or more of content modification of the electronic document or encryption of the electronic document.

In Example 6, the subject matter of any one or more of Examples 1-5 optionally include wherein the second device is configured to perform modifications that are not included in the portion based on the message.

In Example 7, the subject matter of any one or more of Examples 1-6 optionally include wherein the message is further generated to separately indicate the modifications by identifying a modification included in the portion in a field of the message separate from contents of the electronic document.

Example 8 is a method performed by hardware processing circuitry of a first device, comprising: receiving input indicating a first label of a first electronic document; determining document requirements defined by the first label; determining, based on the document requirements, modifications of the first electronic document; determining a first portion of the modifications the first device is configured to perform; modifying, according to the first portion, the first electronic document; generating a message to indicate the label, the electronic document, and separately indicate the modifications made by the first device; and transmitting the message to a second device.

In Example 9, the subject matter of Example 8 optionally includes wherein the input is received from a user interface.

In Example 10, the subject matter of any one or more of Examples 8-9 optionally include wherein determining the document requirements comprises: searching, based on the first label, a data store; determining, based on the search, the document requirements.

In Example 11, the subject matter of any one or more of Examples 8-10 optionally include wherein the first device is a client device, and the message is transmitted to an email server application running on the second device.

In Example 12, the subject matter of any one or more of Examples 8-11 optionally include wherein the modifications include one or more of content modification of the electronic document or encryption of the electronic document.

In Example 13, the subject matter of any one or more of Examples 8-12 optionally include wherein the second device is configured to perform a second portion of the modifications that are not included in the first portion based on the message.

In Example 14, the subject matter of any one or more of Examples 8-13 optionally include wherein the message is further generated to separately indicate the modifications by identifying each of the modifications made in a field of the message separate from contents of the electronic document.

Example 15 is a system comprising: hardware processing circuitry; one or more electronic memories storing instructions that when executed configure the hardware processing circuitry to perform operations comprising: receiving input indicating a first label of a first electronic document; determining document requirements defined by the first label; determining, based on the document requirements, a set of modifications of the first electronic document; determining a subset of the set of modifications the hardware processing circuitry is configured to perform; modifying, based on the subset, the first electronic document; generating a message to indicate the label, the electronic document, and separately indicate the modifications made by the hardware processing circuitry; and transmitting the message to a remote device.

In Example 16, the subject matter of Example 15 optionally includes wherein the input is received from a user interface.

In Example 17, the subject matter of any one or more of Examples 15-16 optionally include wherein determining the document requirements comprises: searching, based on the first label, a data store; determining, based on the search, the document requirements.

In Example 18, the subject matter of any one or more of Examples 15-17 optionally include wherein the hardware processing circuitry is included in a client device, and the message is transmitted to an email server application running on the remote device.

In Example 19, the subject matter of any one or more of Examples 15-18 optionally include wherein the set of modifications includes one or more of content modification of the electronic document or encryption of the electronic document.

In Example 20, the subject matter of any one or more of Examples 15-19 optionally include wherein the remote device is configured to perform, based on the message, modifications from the set of modifications that are not included in the subset 20 is missing parent: 21. The system of Example 15, wherein the message is further generated to separately indicate the modifications by identifying each of the modification made in a field of the message separate from contents of the electronic document.

Example 21 is an apparatus, comprising: means for receiving input assigning a first label to a first electronic document; means for determining document requirements defined by the first label; means for determining, based on the document requirements, modifications of the first electronic document; means for determining a portion of the modifications the device is configured to perform; means for modifying, based on the portion, the first electronic document; means for generating a message to indicate the label, the electronic document, and separately indicate the modifications made by the apparatus; and means for transmitting the message to a second apparatus.

In Example 22, the subject matter of Example 21 optionally includes wherein the means for receiving input is configured to receive input from a user interface.

In Example 23, the subject matter of any one or more of Examples 21-22 optionally include wherein the means for determining the document requirements is configured to: search, based on the first label, a data store; determine, based on the search, the document requirements.

In Example 24, the subject matter of any one or more of Examples 21-23 optionally include wherein the apparatus is a client device, and the message is transmitted to an email server application running on the second apparatus.

In Example 25, the subject matter of any one or more of Examples 21-24 optionally include wherein the modifications include one or more of content modification of the electronic document or encryption of the electronic document.

In Example 26, the subject matter of any one or more of Examples 21-25 optionally include wherein the second apparatus is configured to perform, based on the message, modifications not included in the portion.

In Example 27, the subject matter of any one or more of Examples 21-26 optionally include wherein the means for generating the message is configured to further generate the message to separately indicate the modifications made by identifying each of the modifications in a field of the message separate from contents of the electronic document.

Example 29 is a method, comprising: receiving, from a first device by a second device, a first document, an indication of a label that applies to the first document, and an indication of a first gap between requirements of the label and a first state of the first document; determining, based on the indicated first gap, a first set of modifications to the first document; performing the first set of modifications to the first document; receiving, from a third device by the second device, a second document, an indication that the label applies to the second document, and an indication of a second gap between the requirements of the label and a second state of the second document, the second gap different than the first gap; determining, based on the indicated second gap, a second set of modifications to the second document; and performing the second set of modifications to the second document.

In Example 30, the subject matter of Example 29 optionally includes wherein the first document and the indication of the first gap are received by the second device in a network message, and the first gap is indicated by a list of document properties of the first document that do not meet the requirements of the label.

In Example 31, the subject matter of any one or more of Examples 29-30 optionally include wherein the first document and the indication of the first gap are received by the second device in a network message, and the first gap is indicated by a list of document properties of the first document that meet the requirements of the label.

In Example 32, the subject matter of any one or more of Examples 30-31 optionally include wherein the document properties include one or more of a footer of the first document, a header of the first document, an encryption level of the first document, a password complexity of the first document, or a watermark of the first document.

In Example 33, the subject matter of any one or more of Examples 30-32 optionally include wherein the label defines a plurality of criterion that are met when the first document meets the requirements of the label.

In Example 34, the subject matter of Example 33 optionally includes wherein the first gap identifies document properties of the first document that do not meet their respective criterion defined by the label.

In Example 35, the subject matter of any one or more of Examples 29-34 optionally include wherein the performing of the second set of modifications comprises writing a modified version of the second document to an output device.

In Example 36, the subject matter of any one or more of Examples 29-35 optionally include wherein the first device is configured to perform a first group of modifications to the first document to comply with the label, and the third device's configuration prevents it from performing at least one modification in the first group of modifications.

In Example 37, the subject matter of Example 36 optionally includes wherein a first software application installed on the first device is configured to modify a first property of the first document, and the first software application is not installed on the third device.

Example 38 is a non-transitory computer readable storage medium comprising instructions that when executed configure hardware processing circuitry to perform operations comprising: receiving, from a first device by a second device, a first document, an indication of a label that applies to the first document, and an indication of a first gap between requirements of the label and a first state of the first document; determining, based on the indicated first gap, a first set of modifications to the first document; performing the first set of modifications to the first document; receiving, from a third device by the second device, a second document, an indication that the label applies to the second document, and an indication of a second gap between the requirements of the label and a second state of the second document, the second gap different than the first gap; determining, based on the indicated second gap, a second set of modifications to the second document; and performing the second set of modifications to the second document.

In Example 39, the subject matter of Example 38 optionally includes wherein the first document and the indication of the first gap are received by the second device in a network message, and the first gap is indicated by a list of document properties of the first document that do not meet the requirements of the label.

In Example 40, the subject matter of any one or more of Examples 38-39 optionally include wherein the first document and the indication of the first gap are received by the second device in a network message, and the first gap is indicated by a list of document properties of the first document that meet the requirements of the label.

In Example 41, the subject matter of any one or more of Examples 39-40 optionally include wherein the document properties include one or more of a footer of the first document, a header of the first document, an encryption level of the first document, a password complexity of the first document, or a watermark of the first document.

In Example 42, the subject matter of any one or more of Examples 30-41 optionally include wherein the label defines a plurality of criterion that are met when the first document meets the requirements of the label.

In Example 43, the subject matter of Example 42 optionally includes wherein the first gap identifies document properties of the first document that do not meet their respective criterion defined by the label.

In Example 44, the subject matter of any one or more of Examples 38-43 optionally include wherein the performing of the second set of modifications comprises writing a modified version of the second document to an output device.

In Example 45, the subject matter of any one or more of Examples 38-44 optionally include wherein the first device is configured to perform a first group of modifications to the first document to comply with the label, and the third device's configuration prevents it from performing at least one modification in the first group of modifications.

In Example 46, the subject matter of Example 45 optionally includes wherein a first software application installed on the first device is configured to modify a first property of the first document, and the first software application is not installed on the third device.

Example 47 is a system, comprising: hardware processing circuitry; one or more hardware memories storing instructions that when executed configure the hardware processing circuitry to perform operations comprising: receiving, from a first device by a second device, a first document, an indication of a label that applies to the first document, and an indication of a first gap between requirements of the label and a first state of the first document; determining, based on the indicated first gap, a first set of modifications to the first document; performing the first set of modifications to the first document; receiving, from a third device by the second device, a second document, an indication that the label applies to the second document, and an indication of a second gap between the requirements of the label and a second state of the second document, the second gap different than the first gap; determining, based on the indicated second gap, a second set of modifications to the second document; and performing the second set of modifications to the second document.

In Example 48, the subject matter of Example 47 optionally includes wherein the first document and the indication of the first gap are received by the second device in a network message, and the first gap is indicated by a list of document properties of the first document that do not meet the requirements of the label.

In Example 49, the subject matter of any one or more of Examples 47-48 optionally include wherein the first document and the indication of the first gap are received by the second device in a network message, and the first gap is indicated by a list of document properties of the first document that meet the requirements of the label.

In Example 50, the subject matter of Example 49 optionally includes wherein the document properties include one or more of a footer of the first document, a header of the first document, an encryption level of the first document, a password complexity of the first document, or a watermark of the first document.

In Example 51, the subject matter of any one or more of Examples 47-50 optionally include wherein the label defines a plurality of criterion that are met when the first document meets the requirements of the label.

In Example 52, the subject matter of any one or more of Examples 47-51 optionally include wherein the first gap identifies document properties of the first document that do not meet their respective criterion defined by the label.

In Example 53, the subject matter of any one or more of Examples 47-52 optionally include wherein the performing of the second set of modifications comprises writing a modified version of the second document to an output device.

In Example 54, the subject matter of any one or more of Examples 47-53 optionally include wherein the first device is configured to perform a first group of modifications to the first document to comply with the label, and the third device's configuration prevents it from performing at least one modification in the first group of modifications.

In Example 55, the subject matter of Example 54 optionally includes wherein a first software application installed on the first device is configured to modify a first property of the first document, and the first software application is not installed on the third device.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory; etc.

We claim:

1. A method performed by hardware processing circuitry of a first device, comprising
assigning a first label to a first electronic document;
determining document requirements defined by the first label;

determining, based on the document requirements, a set of modifications of the first electronic document;

determining a first portion of the set of modifications that the first device is configured to perform;

modifying, according to the first portion, the first electronic document;

generating a message to indicate the label, the electronic document, and separately indicate the first portion of the set of modifications made by the first device; and transmitting the message to a network service, the message instructing the network service to perform a remaining portion of the set of modifications on the first electronic document.

2. The method of claim 1, wherein determining the document requirements comprises:

searching, based on the first label, a data store;

determining, based on the search, the document requirements.

3. The method of claim 1, wherein the first device is a client device, and the message is transmitted to an email server application running the network service.

4. The method of claim 1, wherein the set of modifications include one or more of content modification of the electronic document or encryption of the electronic document.

5. The method of claim 1, wherein the network service is configured to perform the remaining portion of the set of modifications that are not included in the first portion based on the message.

6. The method of claim 1, wherein the message is further generated to separately identify each of the modifications made in a field of the message separate from contents of the electronic document.

7. A system comprising:

hardware processing circuitry;

one or more electronic memories storing instructions that when executed configure the hardware processing circuitry to perform operations comprising:

assigning a first label to a first electronic document;

determining document requirements defined by the first label;

determining, based on the document requirements, a set of modifications of the first electronic document;

determining a subset of the set of modifications the hardware processing circuitry is configured to perform;

modifying, based on the subset, the first electronic document;

generating a message to indicate the label, the first electronic document, and separately, indicate the modifications made by the hardware processing circuitry; and transmitting the message to a cloud-based network service, the message instructing the cloud-based network service to complete a remaining portion of the set of modifications of the first electronic document.

8. The system of claim 7, wherein determining the document requirements comprises:

searching, based on the first label, a data store;

determining, based on the search, the document requirements.

9. The system of claim 7, wherein the hardware processing circuitry is included in a client device, and the message is transmitted to an email application providing the cloud-based network service.

10. The system of claim 7, wherein the cloud-based network service is configured to perform, based on the message, modifications from the set of modifications that are not included in the subset.

11. The system of claim 7, wherein the message is further generated to separately indicate the modifications by identifying each of the modification made in a field of the message separate from contents of the first electronic document.

12. A system, comprising:

hardware processing circuitry;

one or more hardware memories storing instructions that when executed configure the hardware processing circuitry to perform operations comprising:

receiving, from a first device by a network service, a first document, an indication of a label that applies to the first document, and an indication of a first gap between requirements of the label and a first state of the first document, the first state of the first document is after application of only a portion of the requirements of the label, and the first gap indicates a portion of the requirements of the label not applied to the first document;

determining, based on the indicated first gap, a first set of modifications to the first document:

performing the first set of modifications to the first document;

receiving, from a second device by the network service, a second document, an indication that the label applies to the second document, and an indication of a second gap between the requirements of the label and a second state of the second document, the second gap different than the first gap;

determining, based on the indicated second gap, a second set of modifications to the second document; and performing the second set of modifications to the second document.

13. The system of claim 12, wherein the first document and the indication of the first gap are received by the network service in a network message, and the first gap is indicated by a list of document properties of the first document that do not meet the requirements of the label.

14. The system of claim 12, wherein the first document and the indication of the first gap are received by the network service in a network message, and the first gap is indicated by a list of document properties of the first document that meet the requirements of the label.

15. The system of claim 14, wherein the document properties include one or more of a footer of the first document, a header of the first document, an encryption level of the first document, a password complexity of the first document, or a watermark of the first document.

16. The system of claim 12, wherein the label defines a plurality of criterion that are met when the first document meets the requirements of the label.

17. The system of claim 16, wherein the first gap identifies document properties of the first document that do not meet their respective criterion defined by the label.

18. The system of claim 12, wherein the performing of the second set of modifications comprises writing a modified version of the second document to an output device.

19. The system of claim 12, wherein the first device is configured to perform a first group of modifications to the first document to comply with the label, and the third device's configuration prevents it from performing at least one modification in the first group of modifications.

20. The system of claim 19, wherein a first software application installed on the first device is configured to modify a first property of the first document, and the first software application is not installed on the third device.

\* \* \* \* \*